(12) United States Patent
Li et al.

(10) Patent No.: US 9,935,758 B2
(45) Date of Patent: *Apr. 3, 2018

(54) METHOD FOR ALLOCATING UPLINK ACK/NACK CHANNELS

(71) Applicant: Samsung Electronics Co., Ltd., Gyeonggi-do (KR)

(72) Inventors: Yingyang Li, Beijing (CN); Xiaoqiang Li, Beijing (CN)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/167,546

(22) Filed: Jan. 29, 2014

(65) Prior Publication Data

US 2014/0146776 A1    May 29, 2014

Related U.S. Application Data

(63) Continuation of application No. 12/866,178, filed as application No. PCT/KR2009/000053 on Jan. 7, 2009, now Pat. No. 8,644,232.

(30) Foreign Application Priority Data

Feb. 4, 2008    (CN) .......................... 2008 1 0005747

(51) Int. Cl.
   H04L 5/00    (2006.01)
   H04L 25/03   (2006.01)
(52) U.S. Cl.
   CPC .......... H04L 5/0094 (2013.01); H04L 5/0053 (2013.01); H04L 5/0091 (2013.01);
   (Continued)

(58) Field of Classification Search
   CPC ..................................... H04L 5/0094
   (Continued)

(56) References Cited

U.S. PATENT DOCUMENTS 8,432,875 B2*    4/2013  Dai et al. ................ 370/336
8,687,652 B2*    4/2014  Zhang et al. ............ 370/468
                         (Continued)

FOREIGN PATENT DOCUMENTS

EP    1796303    6/2007
EP    1850503    10/2007

OTHER PUBLICATIONS

3GPP, 3rd Generation Partnership Project; Technical Specification Group Radio Access Network; Evolved Universal Terrestrial Radio Access (E-UTRA); Physical layer procedures (Release 8), Nov. 2007, Release 8, p. 16.*

(Continued)

Primary Examiner — Rasheed Gidado
(74) Attorney, Agent, or Firm — The Farrell Law Firm, P.C.

(57) ABSTRACT

An apparatus and method are provided for allocating an uplink resource for a User Equipment (UE). The method includes receiving a downlink control channel and a downlink data channel corresponding to the downlink control channel from a base station; identifying a Physical Uplink Control CHannel (PUCCH) resource index for the downlink data channel based on a first Control Channel Element (CCE) of the downlink control channel; and transmitting a PUCCH in an uplink subframe based on the identified PUCCH resource index.

16 Claims, 15 Drawing Sheets

(52) U.S. Cl.
CPC .......... *H04L 5/0007* (2013.01); *H04L 5/0064* (2013.01); *H04L 25/03866* (2013.01)

(58) Field of Classification Search
USPC .......................................................... 370/329
See application file for complete search history.

(56) References Cited

U.S. PATENT DOCUMENTS

| | | | |
|---|---|---|---|
| 2005/0143114 A1 | 6/2005 | Moulsley et al. | |
| 2006/0183438 A1* | 8/2006 | Ishii et al. .................... | 455/101 |
| 2007/0230375 A1* | 10/2007 | Yomo .................. | H04W 52/24 370/280 |
| 2008/0175195 A1* | 7/2008 | Cho et al. ..................... | 370/329 |
| 2008/0205348 A1 | 8/2008 | Malladi | |
| 2008/0232307 A1 | 9/2008 | Pi et al. | |
| 2008/0273513 A1* | 11/2008 | Montojo ............... | H04L 1/1607 370/342 |
| 2009/0046582 A1* | 2/2009 | Sarkar et al. .............. | 370/230.1 |
| 2009/0109912 A1* | 4/2009 | DiGirolamo .......... | H04L 5/0053 370/329 |
| 2009/0168922 A1 | 7/2009 | Malladi et al. | |
| 2009/0279493 A1* | 11/2009 | Gaal ..................... | H04L 1/1861 370/329 |
| 2009/0290538 A1* | 11/2009 | Kim et al. .................... | 370/328 |
| 2010/0098005 A1* | 4/2010 | Lee et al. ...................... | 370/329 |
| 2010/0150081 A1* | 6/2010 | Gao ...................... | H04L 1/1621 370/329 |
| 2010/0182975 A1 | 7/2010 | Malladi et al. | |
| 2011/0199997 A1* | 8/2011 | Wennstrom et al. ......... | 370/329 |
| 2012/0201217 A1* | 8/2012 | Malladi ................ | H04L 1/1607 370/329 |
| 2013/0259011 A1* | 10/2013 | Nakashima et al. ......... | 370/336 |

OTHER PUBLICATIONS

3GPP, "3rd Generation Partnership Project; Technical Specification Group Radio Access Network; Evolved Universal Terrestrial Radio Access (E-UTRA); Physical Layer procedures (Release 8)", Nov. 2007.

PCT/ISA/237 Written Opinion issued in PCT/KR2009/000053 (3pp).

* cited by examiner

METHOD FOR ALLOCATING UPLINK ACK/NACK CHANNELS

PRIORITY

This application is a Continuation application of U.S. application Ser. No. 12/866,178, which was filed in the U.S. Patent and Trademark Office on Aug. 4, 2010, as a National Phase entry of PCT/KR2009/000053, and claims priority under 35 U.S.C. § 119(a) to Chinese Application No. 200810005747.0, which was filed in the State Intellectual Property Office (SIPO) on Feb. 4, 2008, the content of each of which is incorporated herein by reference.

BACKGROUND OF THE INVENTION

1. Field of the Invention

Present invention relates to a wireless communication system, especially to an apparatus and method for allocating uplink ACKnowledgement/Negative ACKnowledgement (ACK/NACK) channels for downlink data transmission in a wireless communication system.

2. Description of the Related Art

The 3$^{rd}$ Generation Partnership Project (3GPP) Standardization organization is taking Long-Term Evolution (LTE) over regulations for existing systems. Its downlink transmission technique is based on Orthogonal Frequency Division Multiplexing (OFDM) and uplink transmission technique is based on Single Carrier Frequency Division Multiple Addressing (SCFDMA). There are two types of frame structures in LTE system, in which type 1 of frame structure applies Frequency Division Duplexing (FDD) and type 2 applies Time Division Duplexing (TDD).

FIG. 1 shows a frame structure in LTE FDD system in which a time duration of radio frame is 307200×$T_s$=10 ms and each frame is divided into 20 time slots 15360$T_s$=0.5 ms long, the slots have indexes ranging from 0 to 19. Each time slot includes a plurality of OFDM symbols whose CP has two types, i.e., a normal CP and an extended CP. Time slots using normal CP include 7 OFDM symbols while the time slots using extended CP have 6 OFDM symbols. Each sub-frame consists of two successive time slots, i.e., a k$^{th}$ sub-frame includes a slot 2k$^{th}$ and a slot (2k+1)$^{th}$.

FIG. 2 illustrates a frame structure in LTE TDD system. Radio frame whose length is 307200×$T_s$=10 ms is divided into two equal half-frames 153600×$T_s$=5 ms long. Each half-frame includes 8 slots with 15360$T_s$=0.5 ms long and 3 special domains, i.e., a Downlink Pilot Time Slot (DwPTS), a Guard Period (GP) and an Uplink Pilot Time Slot (UpPTS), a total length of the three domains is 30720$T_s$=1 ms. Each time slot includes a plurality of OFDM symbols whose CP has two types, i.e., a normal CP and an extended CP. Time slots using normal CP include 7 OFDM symbols while the time slots using extended CP have 6 OFDM symbols. Each sub-frame consists of two successive time slots, i.e., the k$^{th}$ sub-frame includes the 2k$^{th}$ and (2k+1)$^{th}$ time slots. Sub-frame 1 and 2 include the 3 special domains mentioned. According to the discussion result, sub-frame 0 and 5 and DwPTS are constantly assigned for downlink transmission. If a conversion period is 5 ms, UpPTS, sub-frame 2 and 7 are constantly assigned for uplink transmission. If the conversion period is 10 ms, UpPTS and sub-frame 2 are constantly assigned for the uplink transmission.

According to the discussion result up to now, first N OFDM symbols in each downlink sub-frame are adopted to transmit downlink control channels. Here, for FDD, n is less than or equal to 3; for TDD, consideration shall be given into the situation that different requirements for downlink and uplink allocated proportions may require n shall be equal to or greater than 4. Physical Control Format Indicator CHannel (PCFICH) is adopted to transmit the values of above said n, so that Physical Downlink Control CHannel (PDCCH) is transmitted in the first n OFDM symbols. Here, PCFICH is transmitted in the first OFDM symbol of each frame and PDCCH is obtained by combining one or more Control Channel Elements (CCE). Each CCE contains sub-carriers in fixed number. According to the discussion result up to now, the number of CCE contained in PDCCH may be 1, 2, 4 and 8. Moreover, whether it supports 3 CCEs to form a PDCCH or not is still under discussion.

According to the discussion result on LTE, physical time frequency resource is divided into a plurality of Resource Blocks (RBs) which are a minimum grain sizes for resource distribution. Each resource block includes M successive sub-carriers in frequency domain, and N successive symbols in the time, which is OFDM symbols in corresponding downlinks and Single Carrier Frequency Division Multiple Access (SCFDMA) symbols in corresponding uplinks. According to the discussion result on LTE up to now, M is 12, and N is subject to the number of OFDM or SCFDMA symbols in a sub-frame.

According to the discussion result on corresponding uplink control channel in LTE, the uplink control channel includes an ACK/NACK and a Channel Quality Indicator (CQI), etc. When the uplink data transmission does not exit, the uplink control channel is allocated in preserved frequency domains as shown in FIG. 3 which are distributed at both ends of frequency band in the system. Meanwhile, to obtain frequency diversity effect, in a sub-frame, the uplink control channel occupies a RB (301) at the upper end of frequency band in the first time slot and a RB (302) at the lower end of frequency band in the second time slot, or a RB (303) at the lower end of frequency band in the first time slot and a RB (304) at the upper end of frequency band in the second time slot. Therefore, time frequency resource occupied by each control channel is allocated at both ends of frequency band in the system and its number is equal to that of time frequency resource for a RB. According to the discussion result up to now, for the frame structure adopting normal CP, the number of ACK/NACK channels multiplexed in each RB may be 36, 18 or 12; for the frame structure using extended CP, the number of ACK/NACK channels multiplexed in each RB may be 12 or 8. In addition, when uplink data transmission exits, uplink control signaling is transmitted in uplink data channel resource allocated by node B.

According to the discussion result on downlink data transmission based on HARQ in LTE, for non-persistent scheduling, namely dynamic scheduling, indexes of ACK/NACK channels are bound impliedly with the minimum indexes of CCEs which form a PDCCH. According to the discussion result up to now, n, the number of OFDM adopted to transmit downlink control channels in each sub-frame is configured dynamically through PCFICH, so that the number of CCEs available actually in each downlink sub-frame is also configured dynamically through PCFICH; meanwhile, only one part of these available CCEs are adopted to schedule downlink data transmission dynamically. Since only CCEs adopted to schedule downlink data transmission dynamically requires to be bound with uplink ACK/NACK channels actually and the number of ACK/NACK required actually for downlink transmission of each sub-frame changes dynamically. However, the number of ACK/NACK in uplink direction is configured semi-statically, so that in general, only a part of them are occupied. When all ACK/NACK channels in one or more RBs adopted to transmit ACK/NACK information configured semi-statically are not occupied, these RBs can be allocated and adopted to schedule uplink data dynamically in order to make full use of resources in the system.

FIG. 4 shows a schematic diagram for scheduling uplink data dynamically in a RB configured semi-statically and adopted to transmit ACK/NACK. Here suppose that ACK/NACK channel indexes bound with CCE are regarded as indexes of this CCE and the number of multiplexed ACK/NACK channels in each RB is 8. As shown in FIG. 4, a part of CCEs in current sub-frame are adopted to schedule downlink data transmission including 3 PDCCHs which consist of 4, 2 and 2 CCEs respectively. Therefore, there are only 3 occupied actually ACK/NACK channels distributed in the first RB but all ACK/NACK channels in the second RB are available, so that the second RB is idle, which node B can schedule dynamically to transmit uplink data transmission.

FIG. 4 shows a method for binding CCE and ACK/NACK, in which indexes of ACK/NACK channels bound with a CCE are equal to indexes of this CCE. However, under some circumstances, this method fails to reduce effectively the number of RBs in which ACK/NACK occupies. As shown in FIG. 5, suppose that the number of multiplexed ACK/NACK channels in each RB is 8 and 8 CCEs form a PDCCHs, two of which are sent in downlink sub-frame. As shown in FIG. 5, there are 2 ACK/NACK channels occupied actually but both of which belong to different RBs respectively. In order to ensure ACK/NACK channel performance, these two RBs can not be adopted to schedule dynamically uplink data transmission, which results in a failure for putting uplink resource into full use.

In LTE TDD system, configuring locations of switching points for downlink and uplink is able to adjust sub-frame proportion used for downlink and uplink transmissions. According to current results, for the 5 ms switch period, the possible proportion may be 1:3, 2:2 or 3:1; for a 10 ms switching period, the possible proportion may be 6:3, 7:2, 8:1 or 3:5. For the configuration that downlink sub-frame dominates, as downlink sub-frames are more than uplink ones, when ACK/NACK channels are bound for data transmission in each downlink sub-frame, it may be necessary that a plurality of downlink sub-frames shall be bound to ACK/NACK channels in the same uplink sub-frame. Suppose an uplink sub-frame requires to transmit ACK/NACK channels of K downlink sub-frames and let the number of CCEs in K downlink sub-frames be $N_k$, k=0, 1, . . . K−1 respectively. Here, it is indicated dynamically from PCFICH that the number of OFDM symbols adopted to transmit downlink control channel in each sub-frame is n, and then the number of CCEs in each sub-frame is known as $N_k$. A binding method is: firstly, $N_1$ CCEs in a first downlink sub-frame shall be bound with a first $N_1$ ACK/NACK channels in uplink sub-frame; it is followed by that $N_2$ CCEs in a second downlink sub-frame shall be bound with the next $N_2$ ACK/NACK channels in uplink sub-frame; the rest may be deduced similarly.

FIG. 6 shows a schematic diagram of the above method for binding CCEs in a plurality of downlink sub-frames to ACK/NACK channels in one uplink sub-frame. Here suppose 3 ACK/NACK channels in a downlink sub-frame are transmitted in the same uplink sub-frame and the number of CCEs in each sub-frame obtained through PCFICH is 4, 8 and 4. In this way, 4 CCEs in the first downlink sub-frame are bound with ACK/NACK channels 0, 1, 2 and 3 in uplink sub-frame; 8 CCEs in the second downlink sub-frame are bound with ACK/NACK channels 4~11 in uplink sub-frame; 4 CCEs in the second downlink sub-frame are bound with ACK/NACK channels 12~15 in uplink sub-frame.

The binding method shown in FIG. 6 has a problem that its reliability depends on correct receiving of PCFICHs in a plurality of downlink sub-frames. Specifically, in order to receive correctly control channels and identify their used ACK/NACK channels, UE scheduled in a second downlink sub-frame will receive correctly PCFICHs in both the second and the first downlink sub-frames, since in the method for binding ACK/NACK shown in FIG. 6, indexes of ACK/NACK channels bound with CCEs in the second downlink sub-frame depends on the total number of CCEs in the first downlink sub-frame. Similarly, UE scheduled in a third downlink sub-frame shall receive correctly PCFICHs in both the third and the first two downlink sub-frames, since in the method for binding ACK/NACK shown in FIG. 6, indexes of ACK/NACK channels bound with CCEs in the third downlink sub-frame depends on the total number of CCEs in the first two downlink sub-frames. It will be seen that, in addition to the first downlink sub-frame, the reliability for CCE correctly binding with ACK/NACK channels in other downlink sub-frames declines as it depends on correct receiving of PCFICHs in a plurality of sub-frames.

SUMMARY OF THE INVENTION

Accordingly, the present invention is designed to address at least the problems and/or disadvantages described above and to provide at least the advantages described below.

An aspect of present invention is to provide a method for allocating uplink ACK/NACK channels for downlink data transmission in a wireless communication system.

In accordance with an aspect of the present invention, a method is provided for allocating an uplink resource for a User Equipment (UE). The method includes receiving a downlink control channel and a downlink data channel corresponding to the downlink control channel from a base station; identifying a Physical Uplink Control CHannel (PUCCH) resource index for the downlink data channel based on a first Control Channel Element (CCE) of the downlink control channel; and transmitting a PUCCH in an uplink subframe based on the identified PUCCH resource index.

In accordance with another aspect of the present invention, a method is provided for supporting uplink resource allocation for a User Equipment (UE) at a base station. The method includes transmitting a downlink control channel and a downlink data channel corresponding to the downlink control channel to the UE; and receiving a Physical Uplink Control CHannel (PUCCH) in an uplink subframe based on a PUCCH resource index for the downlink data channel, the PUCCH resource index being identified based on a first Control Channel Element (CCE) of the downlink control channel.

In accordance with another aspect of the present invention, a method is provided for allocating an uplink resource for a User Equipment (UE). The method includes receiving at least one downlink control channel and at least one downlink data channel corresponding to the at least one downlink control channel in at least one downlink subframe from a base station; determining at least one Physical Uplink Control CHannel (PUCCH) resource candidate for an uplink subframe based on a first Control Channel Element (CCE) of each of the at least one downlink control channel and a number of the at least one downlink subframe associated with the uplink subframe; identifying ACKnowledgement/ Negative ACKnowledgement (ACK/NACK) information for the at least one downlink data channel, respectively; determining a PUCCH resource among the at least one PUCCH resource candidate based on the identified ACK/ NACK information; and transmitting a PUCCH in the uplink subframe based on the determined PUCCH resource.

In accordance with another aspect of the present invention, a method is provided for supporting uplink resource allocation for a User Equipment (UE) at a base station. The method includes transmitting at least one downlink control channel and at least one downlink data channel in at least one downlink subframe to the UE; and receiving a Physical Uplink Control CHannel (PUCCH) in an uplink subframe based on a PUCCH resource, the PUCCH resource being determined among at least one PUCCH resource candidate based on identified ACKnowledgement/Negative ACKnowledgement (ACK/NACK) information for the at least one downlink data channel, respectively, the at least one PUCCH resource candidate for the uplink subframe being determined based on a first Control Channel Element (CCE) of each of the at least one downlink control channel and a number of the at least one downlink subframe associated with the uplink subframe.

In accordance with another aspect of the present invention, a User Equipment (UE) for allocating an uplink resource is provided. The UE includes a transceiver configured to transceive signals with a base station; and a controller configured to control the transceiver, to receive a downlink control channel and a downlink data channel corresponding to the downlink control channel from the base station, to identify a Physical Uplink Control CHannel (PUCCH) resource index for the downlink data channel based on a first Control Channel Element (CCE) of the downlink control channel and to transmit a PUCCH in an uplink subframe based on the identified PUCCH resource index.

In accordance with another aspect of the present invention, a base station is provided for supporting uplink resource allocation for a User Equipment (UE). The base station includes a transceiver configured to transceive signals with the UE; and a controller configured to control the transceiver, to transmit a downlink control channel and a downlink data channel corresponding to the downlink control channel to the UE, and to receive a Physical Uplink Control CHannel (PUCCH) in an uplink subframe based on a PUCCH resource index for the downlink data channel, the PUCCH resource index being identified based on a first Control Channel Element (CCE) of the downlink control channel.

In accordance with another aspect of the present invention, a User Equipment (UE) is provided for allocating an uplink resource. The UE includes a transceiver configured to transceive signals with a base station; and a controller configured to control the transceiver, to receive at least one downlink control channel and at least one downlink data channel corresponding to the at least one downlink control channel in at least one downlink subframe from the base station, to determine at least one Physical Uplink Control CHannel (PUCCH) resource candidate for an uplink subframe based on a first Control Channel Element (CCE) of each of the at least one downlink control channel and a number of the at least one downlink subframe associated with the uplink subframe, to identify ACKnowledgement/ Negative ACKnowledgement (ACK/NACK) information for the at least one downlink data channel, respectively, to determine a PUCCH resource among the at least one PUCCH resource candidate based on the identified ACK/ NACK information, and to transmit a PUCCH in the uplink subframe based on the determined PUCCH resource.

In accordance with another aspect of the present invention, a base station is provided for supporting uplink resource allocation for a User Equipment (UE). The base station includes a transceiver configured to transceive signals with the UE; and a controller configured to control the transceiver, to transmit at least one downlink control channel and at least one downlink data channel in at least one downlink subframe to the UE and to receive a Physical Uplink Control CHannel (PUCCH) in an uplink subframe based on a PUCCH resource, the PUCCH resource being determined among at least one PUCCH resource candidate based on identified ACKnowledgement/Negative ACKnowledgement (ACK/NACK) information for the at least one downlink data channel, respectively, the at least one PUCCH resource candidate for the uplink subframe being determined based on a first Control Channel Element (CCE) of each of the at least one downlink control channel and a number of the at least one downlink subframe associated with the uplink subframe.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
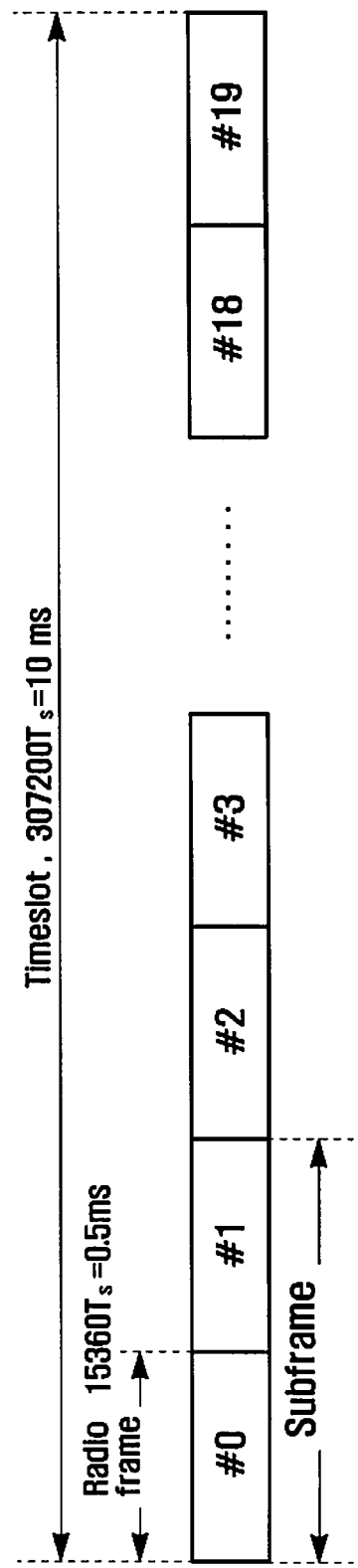
FIG. 1 shows an LTE TDD frame structure.
Figure 2:
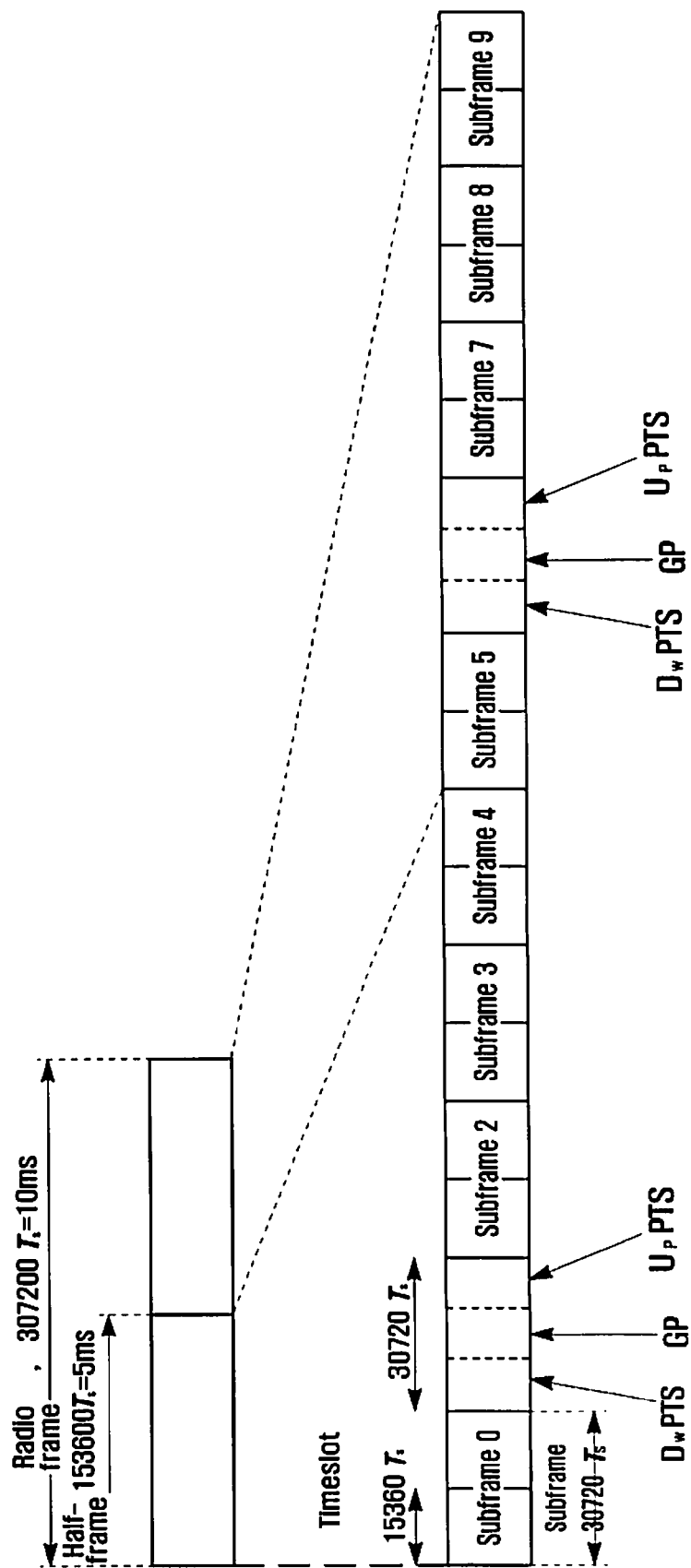
FIG. 2 shows an LTE TDD frame structure.
Figure 3:
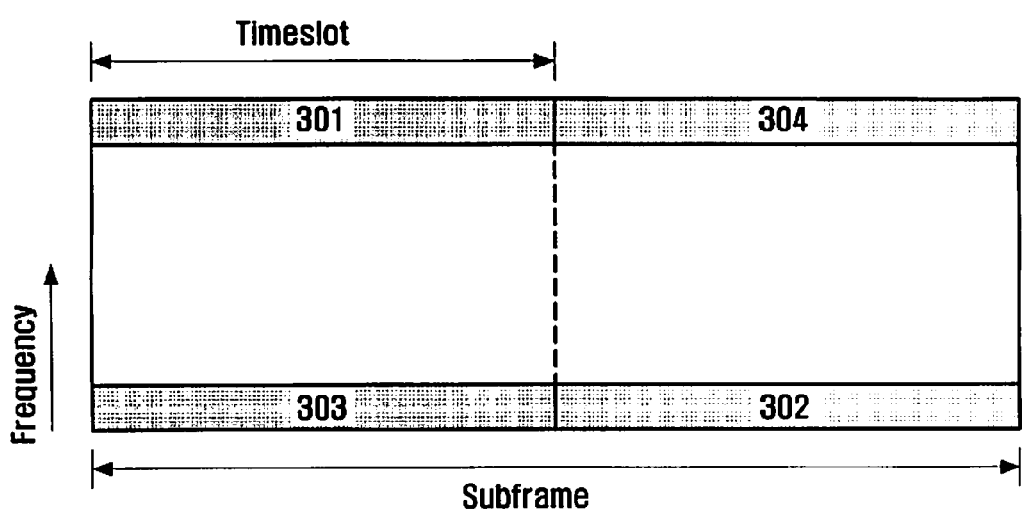
FIG. 3 shows an uplink control channel structure.
Figure 4:
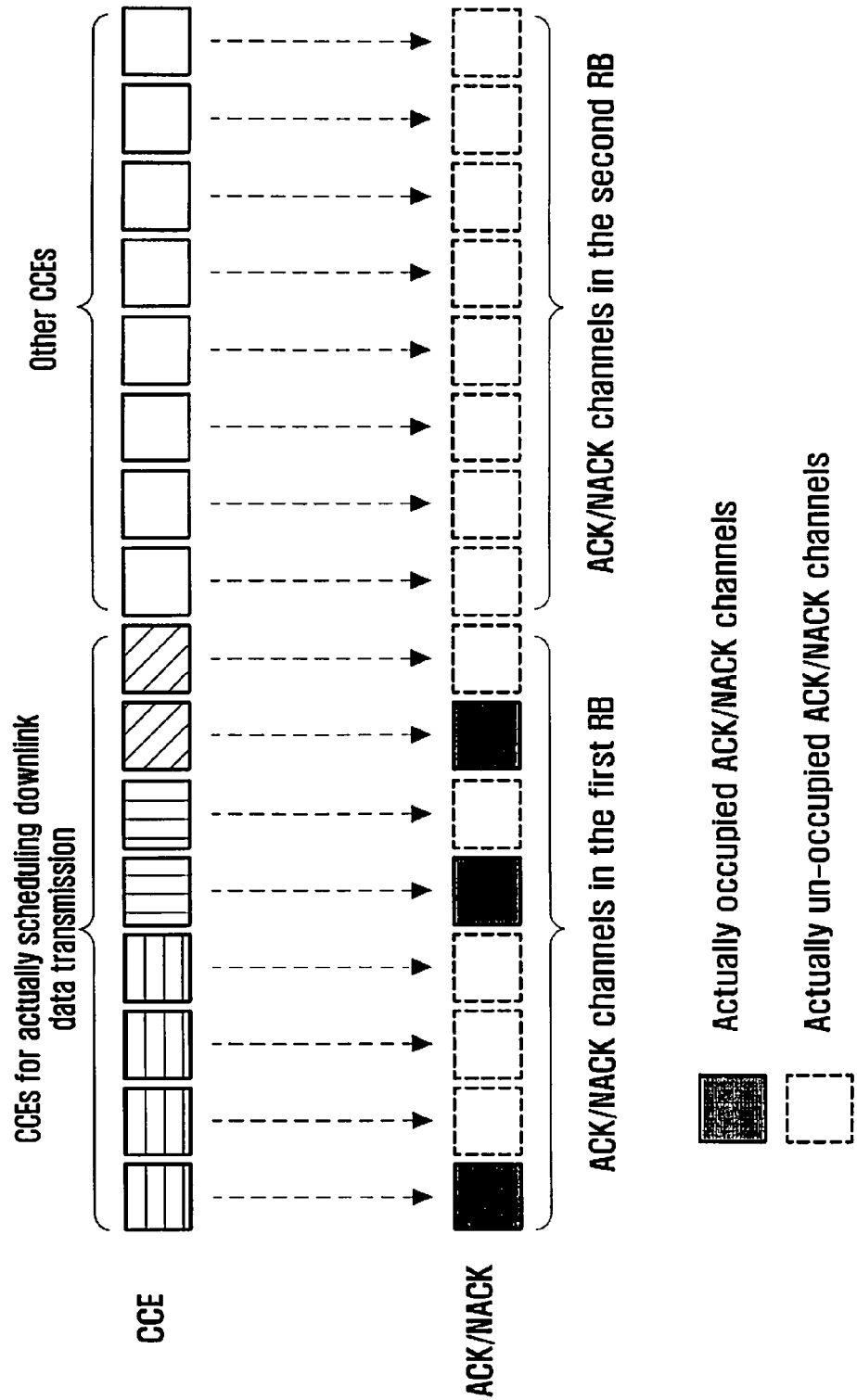
FIG. 4 shows a schematic diagram 1 of CCE for binding with ACK/NACK channels.
Figure 5:
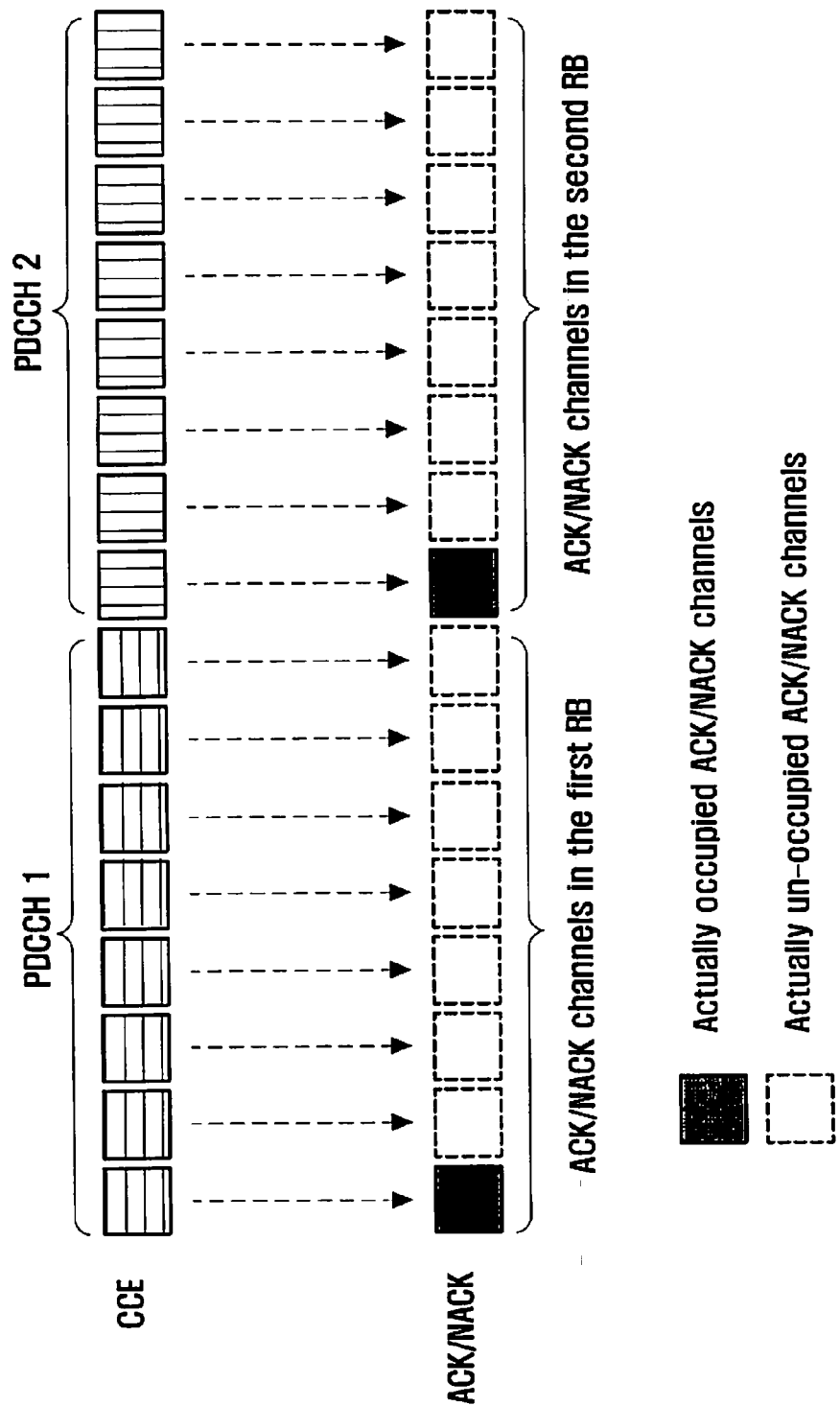
FIG. 5 shows a schematic diagram 2 of CCE for binding with ACK/NACK channels.
Figure 6:
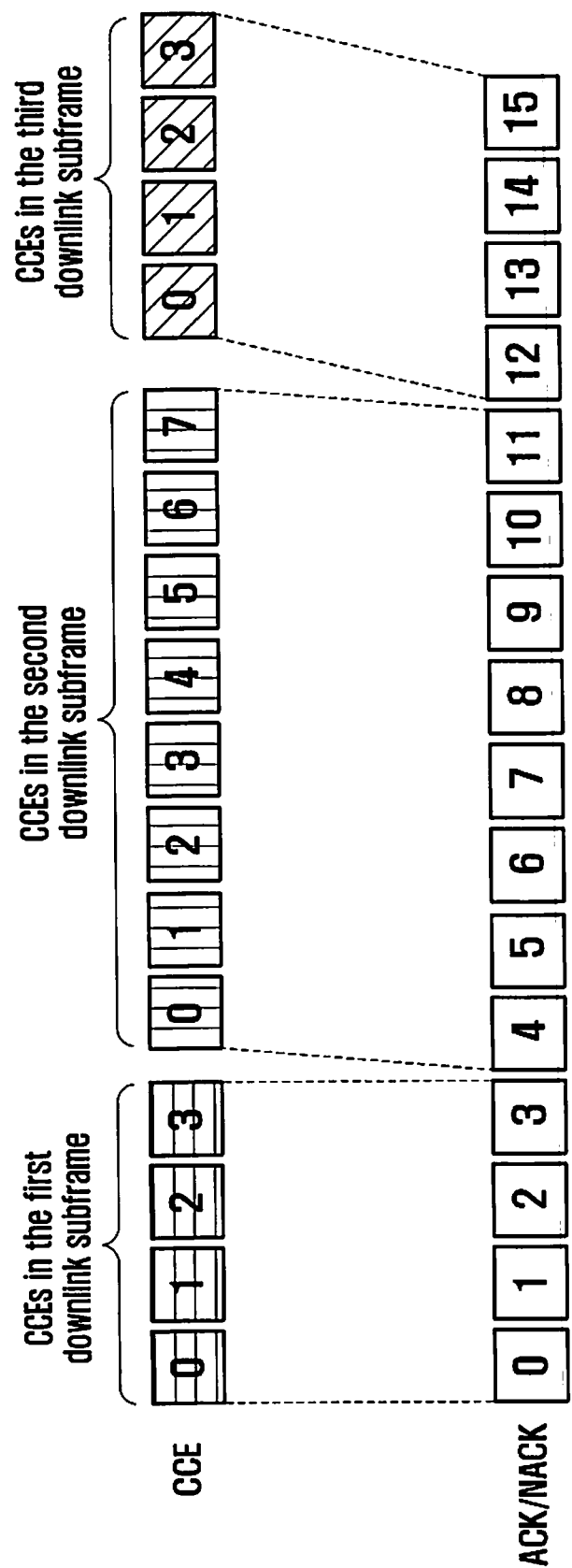
FIG. 6 shows a schematic diagram for binding CCEs in a plurality of sub-frames with ACK/NACK channels.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Present invention provides a method for impliedly binding CCE in one sub-frame with ACK/NACK channel indexes in one uplink sub-frame, and a method for impliedly binding CCE indexes in a plurality of sub-frames and ACK/NACK channel indexes in one uplink sub-frame.

Solution 1: Impliedly Binding CCE in One Downlink Sub-Frame with ACK/NACK

Here the method for impliedly binding CCE indexes in one sub-frame with ACK/NACK channel indexes in one uplink sub-frame is discussed. The method may be used in both the LTE FDD system and the LTE TDD system.

Generally, suppose that a PDCCH is obtained by combining a plurality of CCEs and may contain N CCEs. According to the discussion results, N is equal to 4 in LTE system and the number of CCEs contained in the PDCCH may be 1, 2, 4 and 8. Here, the method for binding CCE with ACK/NACK channels is that the CCEs with the minimum index in each PDCCH having most number of CCEs are bound to the ACK/NACK channels with less index values, and other CCEs are bound to ACK/NACK channels with greater index values.

The following is description of an implementation step for the method for binding CCE to ACK/NACK channels. M values are selected from N values of CCEs contained in PDCCH, and let it be $C_m$, m=0, 1, . . . M−1, where M is less than or equal to N. Here suppose that $C_m$ decreases with m monotonously. Firstly, CCEs with the minimum index in each PDCCH having $C_0$ CCEs are obtained respectively and the number of the CCEs obtained is denoted as $P_0$. These CCEs are bound to successive $P_0$ ACK/NACK channels indexed from 0 in turns. Then, the method consists of obtaining the CCEs with the minimum index of the PDCCH having $C_1$ CCEs respectively from remaining CCEs which are not bound to ACK/NACK, denoting its number is $P_1$, binding these CCEs to successive $P_1$ ACK/NACK channels indexed from $P_0$ in turns. Generally, each of the CCEs with the minimum index of the PDCCH having $C_k$ CCEs are obtained respectively from remaining CCEs which are not bound to ACK/NACK, the number of the CCEs obtained is denoted as $P_k$, these CCEs are bound to successive $P_k$ ACK/NACK channels indexed from $$\sum_{j=0}^{k-1} P_j$$

in turns. Repeating the above mentioned process until all of CCEs are bound to ACK/NACK channel.

When the number $C_m$ of CCEs contained in the PDCCH has power of 2, namely $C_m=2^m$, m=0, 1, . . . M−1, and further suppose that, the PDCCH which contains $C_m$ CCEs only occupies successive $C_m$ CCEs indexed from $1 \sim C_m$, denoting the number of CCEs in sub-frame is $N_{CCE}$, its index is $0 \sim N_{CCE}-1$, 1 is an integer greater than or equal to 0 and $1 \cdot C_m < N_{CCE}$, denoting $AN_i$ is the index of ACK/NACK bound with the $i^{th}$ CCE, so that the indexes of ACK/NACK bound with each CCE are determined upon the following procedure:

for i = 0 to $N_{CCE}$ − 1
  if mod(i,$2^{M-1}$) = 0 and $N_{CCE}$ − 1 − i ≥ $2^{M-1}$ − 1

$$AN_i = \frac{i}{2^{M-1}};$$

else
    for j = M−2 to 0
      if mod(i,$2^j$) = 0 and $N_{CCE}$ − 1 − i ≥ $2^{M-1}$ − 1

$$AN_i = \left\lfloor \frac{N_{CCE}}{2^{j+1}} \right\rfloor + \left\lceil \frac{i}{2^{j+1}} \right\rceil;$$

break;
      end if
    end for
  end if
end for

With this method, ACK/NACK channels bound with CCE shall be ensured to be centralized into less index values as best as they can, so that more RBs configured for ACK/NACK channels are idle and node B can schedule dynamically such RBs for uplink data transmission so as to improve resource utilization rate.

Figure 7:
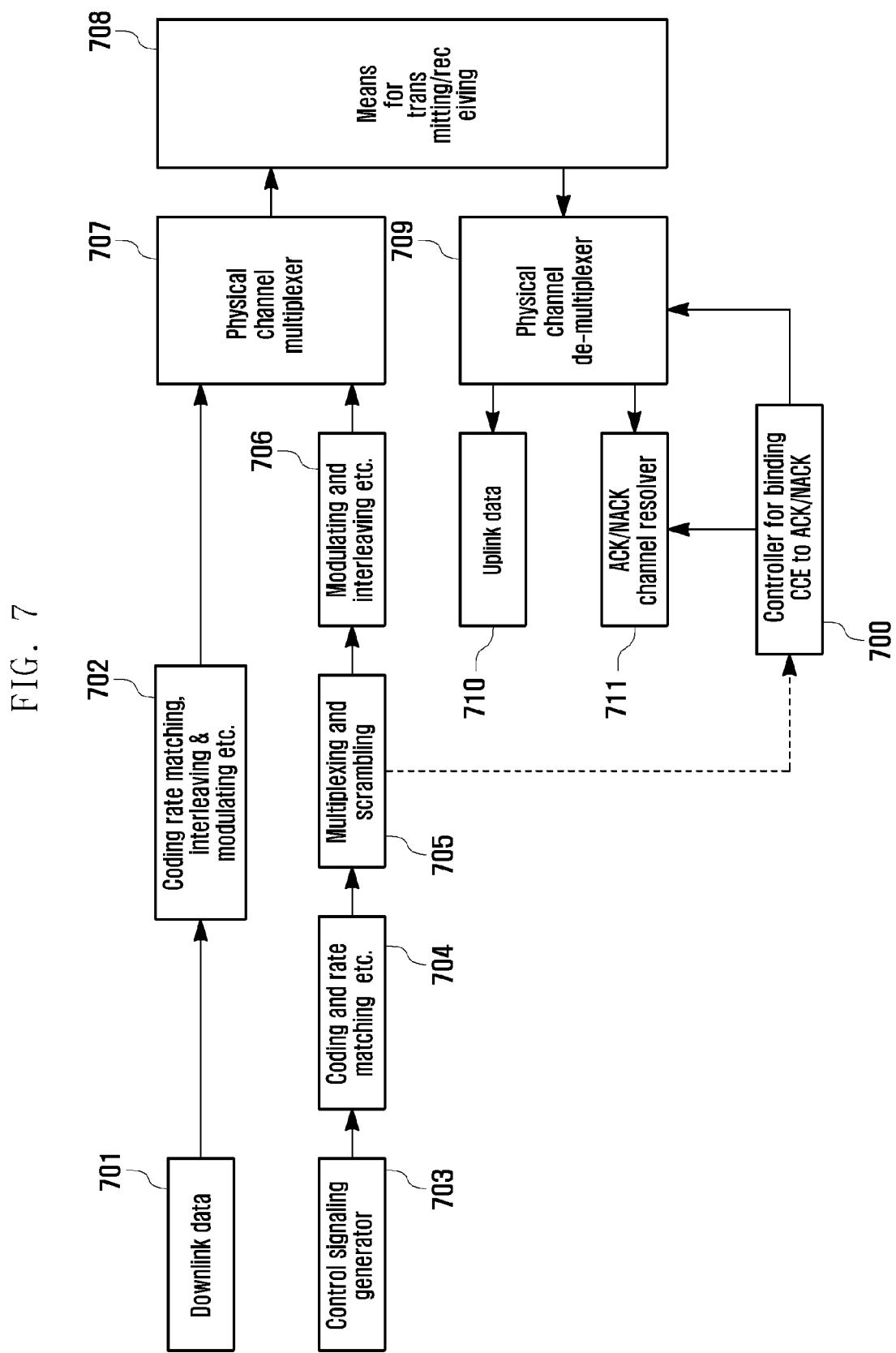
FIG. 7 shows a block diagram of an apparatus in Node B for processing data transmission.

FIG. 7 shows a block diagram of an apparatus of Node B for processing data transmission. First of all, the node B generates downlink control information (703) for scheduling each UE. The information generated includes control information for scheduling downlink transmission and control information for scheduling uplink transmission. Then operations of coding, rate matching (704) and so on are performed. Next, the node B multiplexes and scrambles downlink control information for each UE (705). It is followed by that the node B modulates and interleaves multiplexed downlink control information (706) and finally inputs to physical channel multiplexer (707).

In module 705, the node B tries its best to ensure each ACK/NACK bound with CCE with the minimum index occupied for scheduling control channel of downlink transmission is centralized into less index values, so that a part of time frequency resource among resources allocated semi-statically for transmitting ACK/NACK will not be adopted actually to transmit ACK/NACK information and these non-occupied resources can be allocated dynamically for uplink data transmission. For downlink data (701), the node B performs operations of coding, rate matching, interleaving, modulating and other operations on them (702) and then inputs to physical channel multiplexer (707). Node B multiplexes downlink data and downlink control information in module 707 and transmits them through a means for transmitting/receiving (708). Then, the node B performs reception through the means for transmitting/receiving (708), performs de-multiplexing to obtain the uplink data (710) and ACK/NACK channels with physical channel de-multiplexer (709), in which the de-multiplexing on uplink data and ACK/NACK channels are controlled by the controller for binding CCE and ACK/NACK (700). That is the node B obtains the indexes of ACK/NACK channels occupied actually for each scheduled downlink data transmission in the current uplink sub-frame, based on the minimum CCE index of downlink control channel used for scheduling this downlink data transmission. With the method of present invention for binding CCE with ACK/NACK, the indexes of the ACK/NACK channels occupied actually in the current uplink sub-frame are obtained, and the ACK/NACK channels are obtained by de-multiplexing on the resource on which the ACK/NACK channels are transmitted actually.

Next, the node B detects ACK/NACK channels in corresponding indexes with an ACK/NACK channel resolver (711); for uplink data, based on the method for node B for allocating uplink resources, node B may need to de-multiplex uplink data in a part of ACK/NACK channel resources.

Figure 8:
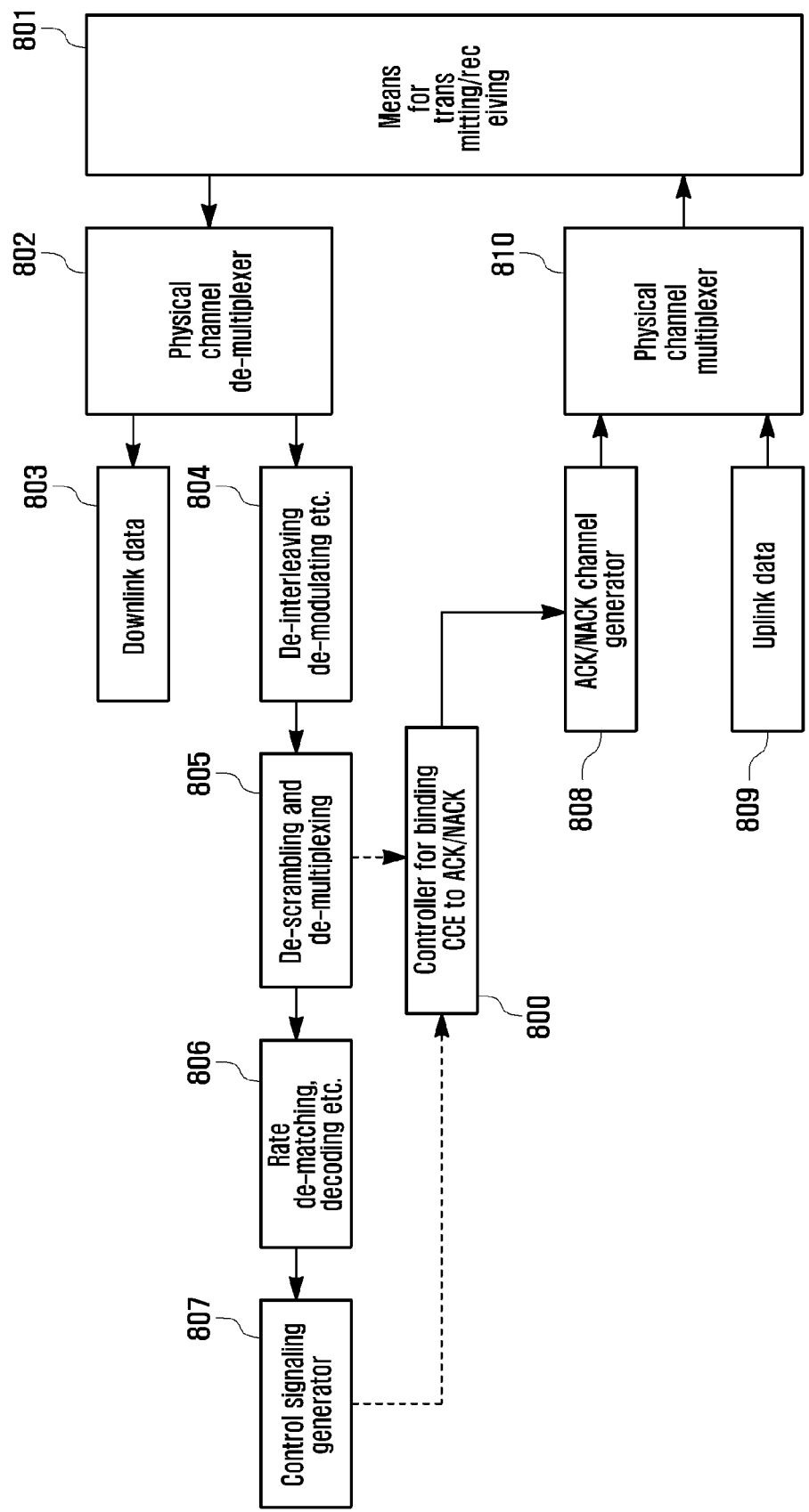
FIG. 8 shows a block diagram of an apparatus in UE for processing data transmission.

FIG. 8 shows a block diagram of an apparatus in the UE for processing data transmission. First of all, a reception operation is performed through a means for transmitting/receiving (801), a downlink physical control channel is obtained with a physical channel de-multiplexer (802), and operations of de-scrambling and de-multiplexing are performed in a module 805 after de-interleaving, de-modulating and other operations (804). In which the UE performs a busy inspection over all kinds of control channels which may be consisted of one or more CCEs, performs rate de-matching and decoding in module 806, and determines whether this control channel is transmitted to the UE itself or not in module 807. suppose that the UE detects control channel transmitted to itself for scheduling downlink data transmission, then on one hand, the UE de-multiplexes and processes the downlink data (803) with the physical channel de-multiplexer (802) based on the control information sent from node B; on another hand, the UE obtains ACK/NACK channel indexes allocated to itself in the controller 800 for binding CCE with ACK/NACK based on the minimum CCE index of control channel by the method of present invention. Then, the UE generates the ACK/NACK control information (808), obtains ACK/NACK channel indexes in module 800, multiplexes ACK/NACK information with physical channel multiplexer (810) and transmits them via the means for transmitting/receiving (801). Furthermore, when the UE detects the control signaling for the node B scheduling the uplink data transmission in module 807, the UE multiplexes the uplink data (809) with physical channel multiplexer (810) and sends them with the means for transmitting/receiving (801).

Solution 2: Impliedly Binding CCEs in a Plurality of Downlink Sub-Frames with ACK/NACKs Here the method for impliedly binding CCE indexes in a plurality of sub-frames with ACK/NACK channel indexes in one uplink sub-frame is discussed, which may be used in LTE TDD system.

Suppose one uplink sub-frame requires to transmit ACK/NACKs channel of K downlink sub-frames, the way of binding CCEs to ACK/NACK channels is to bind CCEs in the $k^{th}$ downlink sub-frame to ACK/NACK channel indexed as $l \cdot K + k$, in which $k = 0, 1, \ldots K-1$, $l$ is an integer greater than or equal to 0 and $l \cdot K + k < N_{AN}$, $N_{AN}$ is a total number of ACK/NACK channels configured in this uplink sub-frame. Denote the $A_k$ is a set of ACK/NACK channels indexed as $l \cdot K + k$, and ACK/NACK channels in the set $A_k$ are arranged in the order that the indexes increase, so that the ACK/NACK channel indexed as $l \cdot K + k$ is indexed as $l$ in the set $A_k$. The way for binding CCE in the $k^{th}$ downlink sub-frame to ACK/NACK channel in the set $A_k$ may be but not limited: a method for impliedly binding CCE index in one sub-frame with ACK/NACK channel index in an uplink sub-frame in the solution 1 of present invention, however, each CCE index in the $k^{th}$ downlink sub-frame is bound with ACK/NACK channel index which is no longer the index in uplink sub-frame but in set $A_k$; a method for enabling ACK/NACK channel index in set $A_k$ bound with each CCE in the $k^{th}$ downlink sub-frame to be equal to the index of this CCE in the $k^{th}$ downlink sub-frame.

By this method, the index of each ACK/NACK channel bound with CCE in downlink sub-frame is not related to the number of CCEs in other downlink sub-frame, i.e., only when UE for scheduling downlink data transmission in a certain downlink sub-frame receives the PCFICH of this downlink sub-frame correctly, it obtains ACK/NACK channel indexes based on the CCE occupied by its PDCCH regardless the PCFICH of other sub-frames.

Description of two available methods of present invention for indexing a plurality of downlink sub-frames in response to one uplink sub-frame is given. However present invention is not limited to both indexing methods.

A first indexing method is that K downlink sub-frames in response to one uplink sub-frame can be indexed by time sequence, $k = 0, 1, \ldots K-1$. In this way, according to the above method for binding CCE to ACK/NACK channel, the CCE in $k^{th}$ downlink sub-frame is bound to ACK/NACK channel indexed as $l \cdot K + k$. A second indexing method is to number successively each downlink sub-frame in a TDD switching period (5 ms or 10 ms), suppose that there is a total of $N_D$ downlink sub-frames in a switching period, so that all downlink sub-frames in one switching period are numbered as $n = 0, 1, \ldots N_D - 1$. In this way, for K downlink sub-frames in response to one uplink sub-frames, the downlink sub-frame numbered n can be indexed as $k = \mod(n, K)$ in this K downlink sub-frames. In this way, according to the above method for binding CCE to ACK/NACK channel, the CCE numbered n in downlink sub-frame is bound to ACK/NACK channel indexed as $l \cdot K + k = l \cdot K + \mod(n, K)$.

Suppose one uplink sub-frame requires to transmit ACK/NACK channel of K downlink sub-frames, the second method for binding CCE to ACK/NACK channel is that, for CCE in the $k^{th}$ downlink sub-frame, ACK/NACK channels are allocated starting from ACK/NACK channel indexed as $f(k)$, $f(k)$ is a function of k, e.g., $f(k) = k \cdot N_S$ or $f(k) = (K-1-k) \cdot N_S$, $k = 0, 1, \ldots K-1$, $N_S$ can be equal to $$\left\lfloor \frac{N_{AN}}{K} \right\rfloor$$

or $$\left\lceil \frac{N_{AN}}{K} \right\rceil,$$

$N_{AN}$ is the total number of ACK/NACK channels configured in this uplink sub-frame. Suppose that a CCE in the $k^{th}$ downlink sub-frame is indexed as c, ACK/NACK channel bound with this CCE is indexed as $\mod(f(k) + f(c), N_{AN})$, $f(c)$ is a function of c. For example, if $f(k) = k \cdot N_S$, $f(c) = c$, ACK/NACK channel bound with CCE indexed as c is indexed as $\mod(k \cdot N_S + c, N_{AN})$; or if $f(k) = k \cdot N_S$, $f(c) = -c$, ACK/NACK channel bound with CCE indexed as c is indexed as $\mod(k \cdot N_S - c, N_{AN})$. With this method, when the number of CCEs in each downlink sub-frame is less than or equal to $N_S$, all downlink sub-frames are bound to different ACK/NACK channels respectively. When the number of CCEs in one or more downlink sub-frames is greater than $N_S$, a plurality of downlink sub-frames may be bound to the same ACK/NACK channel and by now, node B scheduler has to ensure no conflict exits in ACK/NACK channels for its scheduled downlink data transmission.

ACK/NACK channel bound with CCE is determined by the index k of downlink sub-frame and CCE index c of the $k^{th}$ downlink sub-frame, together with introducing other parameters such as the index p of the first PRB allocated by node B for data channel. In this way, it can be defined that ACK/NACK channel index bound with CCE indexed as c and PRB indexed as p is indexed as $\mod(f(k) + f(c, p), N_{AN})$, $f(c, p)$ is the function of c and p. For example, if $f(k) = k \cdot N_S$, f(c, p)=c+p, ACK/NACK channel bound is indexed as mod(k·$N_S$+c+p,$N_{AN}$); or if f(k)=k·$N_S$, f(c,p)=−c−p, ACK/NACK channel bound is indexed as mod(k·$N_S$−c−p,$N_{AN}$).

In the LTE system, node B could configure a plurality of uplink RBs for transmitting ACK/NACK information; meanwhile, a plurality of ACK/NACK channels could be multiplexed in each uplink RB. So that when uplink ACK/NACK channels are indexed, one indexing method is to index first all ACK/NACK channels in one RB, then index those in next RB; the other indexing method is to index first one ACK/NACK channel in all RBs, then index a next one in all RBs. For the second method above for binding CCEs to ACK/NACK channels, present invention is not be limited any methods for indexing uplink ACK/NACK channels, i.e., it can be indexing methods or other methods.

Present invention provides some expressions on the methods for binding CCEs to ACK/NACK channels, the other expressions may be used as long as it could achieve the same effect with formulas provided in present invention.

Solution 3: a Method for Mapping a Plurality of CCEs to One ACK/NACK Channel

For the TDD system, in a case of some configuration proportion between some uplinks and downlinks, ACK/NACKs in several downlink sub-frames need to be transmitted in the same uplink sub-frame. Suppose the number of downlink sub-frames and ACK/NACK channels in uplink sub-frames are K and $N_{AN}$ respectively. An available method is to divide all ACK/NACK channels into K parts, and then each downlink sub-frame occupies one part of channels among K parts. The ACK/NACK channels could be divided into K parts equally. For example, by the method described in the solution 2 of present invention, that is, the CCE in the $k^{th}$ downlink sub-frame is bound to ACK/NACK channel indexed as l·K+k, where, k=0, 1, ... K−1, l is an integer greater than or equal to 0 and l·K+k<$N_{AN}$; or CCE in the $k^{th}$ downlink sub-frame is bound to ACK/NACK indexed as $$k\frac{N_{AN}}{K} \sim (k+1)\frac{N_{AN}}{K} - 1, k=0, 1, \ldots K-1.$$

Please be noted that for the second method, when $N_{AN}$ is unable to be divided exactly by K, the above mentioned formula may be modified slightly. When dividing into K parts, the number of ACK/NACK allocated to downlink sub-frames depends on the characteristic of the sub-frame. For example, the number of ACK/NACK channels allocated to downlink sub-frames only scheduled for downlink transmission is less, and that of ACK/NACK channels allocated to downlink sub-frames scheduled for both downlink transmission and uplink transmission are greater. It is because that for the downlink sub-frames scheduled for both uplink and downlink transmissions, although the PDCCH scheduled for the uplink transmission does not need ACK/NACK channels, ACK/NACK channels are still occupied impliedly. For example, the number of ACK/NACK channels of downlink sub-frames scheduled for both uplink and downlink transmissions can be configured to be twice that of ACK/NACK channels allocated to downlink sub-frames only scheduled for downlink transmission.

Suppose that the number of CCEs of one downlink sub-frame is $N_{CCE}$, and the number of ACK/NACK allocated to the downlink sub-frame is $N_{AN}^{part}$. When $N_{CCE}$>$N_{AN}^{part}$, a plurality of CCEs are mapped to one ACK/NACK. Node B scheduler may ensure no conflict exists in ACK/NACK channels that it schedules for downlink data transmission. When the CCE indexed as $i_{CCE}$ is mapped to ACK/NACK indexed as $i_{AN}$=mod($i_{CCE}$+δ, $N_{AN}^{part}$) or $i_{AN}$=mod($i_{CCE}$,$N_{AN}^{part}$)+δ, where CCE and ACK/NACK are indexed from 0 and δ is a constant which can be predefined or configured semi-statically. Since the index of an ACK/NACK channel for downlink HARQ transmission is determined by a CCE with the minimum index of PDCCH which consists of a plurality of CCEs (1, 2, 4 or 8), when $N_{AN}^{part}$ is an even integer, several PDCCHs which consist of 2-CCE (or 4-CCE or 8-CCE) will be mapped to the same ACK/NACK, so that it will limit the number of the PDCCH with 2-CCE (or 4-CCE, or 8-CCE) transmitted along the downlink direction simultaneously so as to limit the scheduling on the node B.

In order to solve this problem, present invention provides a method in which one circular offset η is added when CCEs are mapped to one ACK/NACK repeatedly. Here, η is used for ensuring that all PDCCHs with 2-CCE (or 4-CCE, or 8-CCE) are mapped to different ACK/NACKs when the plurality of CCEs are mapped to ACK/NACKs. This circular offset η could be determined based on σ=mod($N_{AN}^{part}$+1, 2), a parity of $N_{AN}^{part}$, and $$n = \left\lfloor \frac{i_{CCE}}{N_{AN}^{part}} \right\rfloor$$

(a number of times that CCEs are mapped to ACK/NACKs). For example, when $i_{CCE}$<$N_{AN}^{part}$, $i_{AN}$=mod($i_{CCE}$+δ, $N_{AN}^{part}$); when $i_{CCE}$>$N_{AN}^{part}$, $i_{AN}$=mod($i_{CCE}$+δ+η,$N_{AN}^{part}$). Or, when $i_{CCE}$<$N_{AN}^{part}$, $i_{AN}$=mod($i_{CCE}$,$N_{AN}^{part}$)+δ; when $i_{CCE}$>$N_{AN}^{part}$, $i_{AN}$=mod($i_{CCE}$+η,$N_{AN}^{part}$)+δ.

Three methods for identifying η will be but not limited to:

$$\eta = \sigma = \mod(N_{AN}^{part} + 1, 2),$$

$$\eta = \sigma + n - 1 = \mod(N_{AN}^{part} + 1, 2) + \left\lfloor \frac{i_{CCE}}{N_{AN}^{part}} \right\rfloor - 1 \text{ and}$$

$$\eta = \sigma \cdot n = \mod(N_{AN}^{part} + 1, 2) \cdot \left\lfloor \frac{i_{CCE}}{N_{AN}^{part}} \right\rfloor.$$

With the third method for identifying η, the methods according to present invention for mapping CCE to ACK/NACK can also be expressed as: for all CCEs, the indexes of the ACK/NACK to which the CCEs are mapped are $$i_{AN} = \mod\left(i_{CCE} + \delta + \mod(N_{AN}^{part} + 1, 2) \cdot \left\lfloor \frac{i_{CCE}}{N_{AN}^{part}} \right\rfloor, N_{AN}^{part}\right), \text{ or}$$

$$i_{AN} = \mod\left(i_{CCE} + \mod(N_{AN}^{part} + 1, 2) \cdot \left\lfloor \frac{i_{CCE}}{N_{AN}^{part}} \right\rfloor, N_{AN}^{part}\right) + \delta.$$

The methods in Solution 3 may be applied in both the TDD system and the FDD system.

Figure 9:
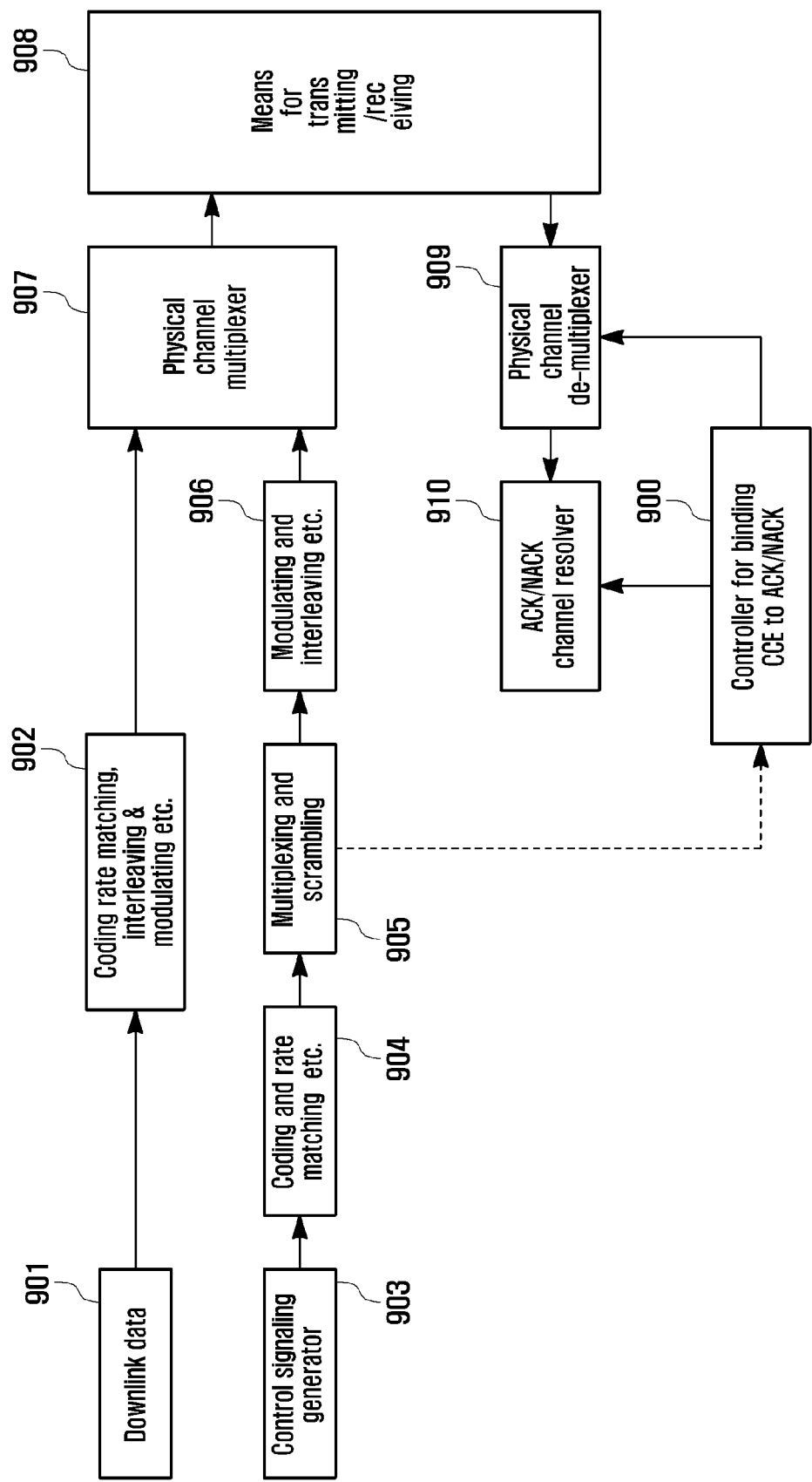
FIG. 9 shows a block diagram of an apparatus in Node B for processing downlink data transmission.

FIG. 9 shows a block diagram of an apparatus of Node B for processing downlink data transmission. Firstly, node B generates downlink control information (903) for each UE for scheduling downlink data transmission, then performs coding, rate matching and other operations (904). Next, node B multiplexes and scrambles downlink control information for each UE together (905). Then the node B modulates and interleaves multiplexed downlink control information (906) and inputs to physical channel multiplexer (907). For the downlink data (901), the node B performs coding, rate matching, interleaving, modulating and other operations on them (902) and then inputs to physical channel multiplexer (907). Node B multiplexes downlink data and downlink control information in module 907 and transmits them through the means for transmitting/receiving (908). Next, node B receives through the means for transmitting/receiving (908), and de-multiplexes ACK/NACK channels in each downlink frame for downlink data transmission with the physical channel de-multiplexer (909). The de-multiplexing of ACK/NACK is controlled by the controller for binding CCE to ACK/NACK (900). That is, the node B obtains the indexes of ACK/NACK channels occupied by each scheduled downlink data transmission actually in current sub-frame, based on the minimum CCE index of downlink control channel used for scheduling this downlink data transmission using the method of present invention for binding CCE with ACK/NACK, then de-multiplexes ACK/NACK channels according to the index of this ACK/NACK channel. Next, the node B detects ACK/NACK channels in corresponding indexes with ACK/NACK channel resolver (910).

Figure 10:
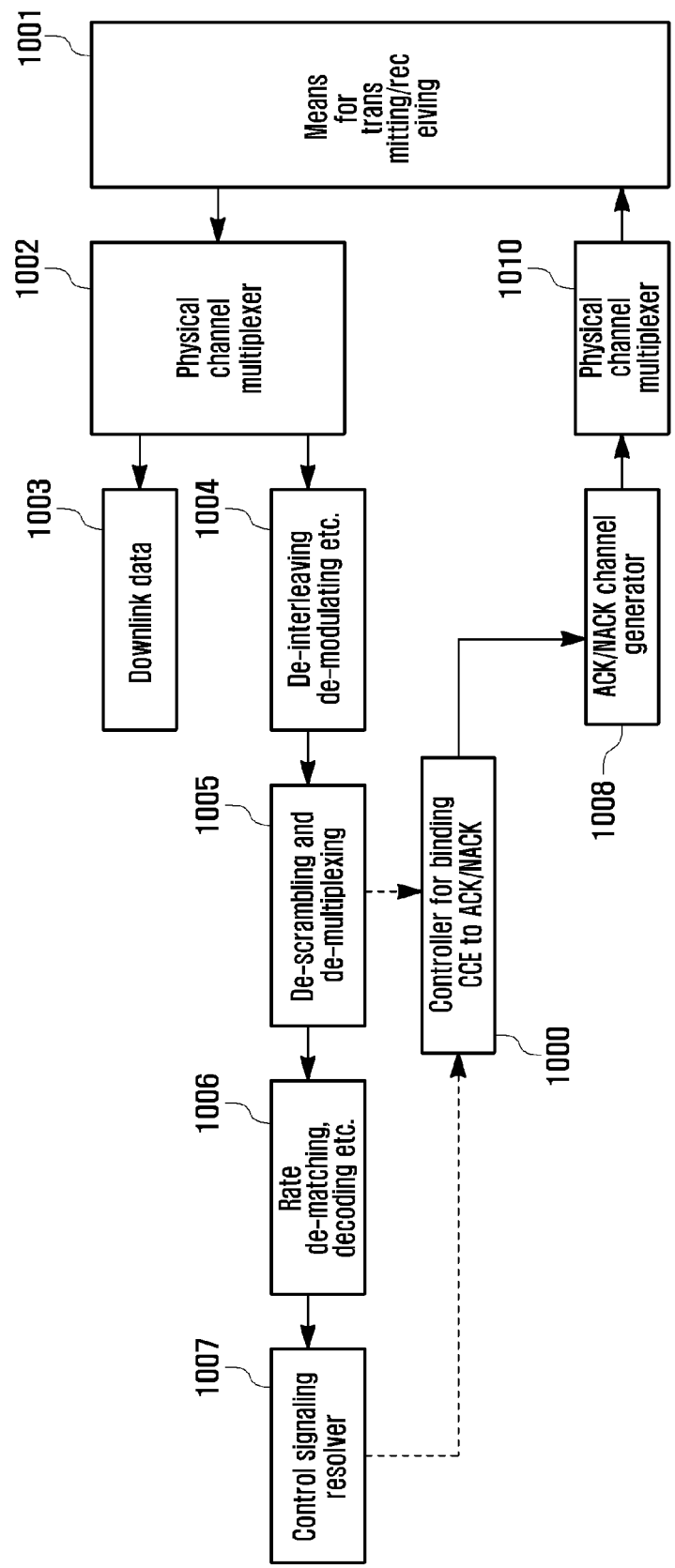
FIG. 10 shows a block diagram of an apparatus in UE for processing downlink data transmission.

FIG. 10 shows a block diagram of an apparatus of UE for processing downlink data transmission. First of all, it performs reception through the means for transmitting/receiving (1001), de-multiplexes out the downlink physical control channel by the physical channel de-multiplexer (1002) and performs de-interleaving, de-modulating and other operations (1004), de-scrambles and de-multiplexes in a module 1005, in which the UE performs the busy inspection over all kinds of possible control channels which may be consisted of one or more CCEs, performs rate de-matching and decoding in module 1006, and determines whether this control channel is sent to itself in module 1007. Suppose that UE detects control channel sent to itself for scheduling downlink data transmission, on one hand, UE de-multiplexes and processes downlink data (1002) with physical channel de-multiplexer (1003) based on control information sent from node B. On another hand, the UE obtains ACK/NACK channel indexes allocated to itself in the controller 1000 for binding CCE with ACK/NACK, based on the minimum CCE index of control channel and indexes of downlink sub-frames occupied for downlink data transmission by the method of present invention. Then, the UE generates ACK/NACK control information (1008), obtains ACK/NACK channel indexes in module 1000, multiplexes ACK/NACK information with physical channel multiplexer (1110) and sends them with transmitting/receiving set (1001).

Embodiments

In this section, five embodiments according to present invention are introduced. To avoid make the specification ambiguous, detailed well-known configuration is omitted.

A First Embodiment

A first embodiment of the method for impliedly binding CCE indexes in one sub-frame and ACK/NACK channel indexes in an uplink sub-frame is given. The LTE system is taken as an example. According to the discussion results up to now, in LTE system, the number of CCEs contained in PDCCH may be 1, 2, 4 and 8.

Figure 11:
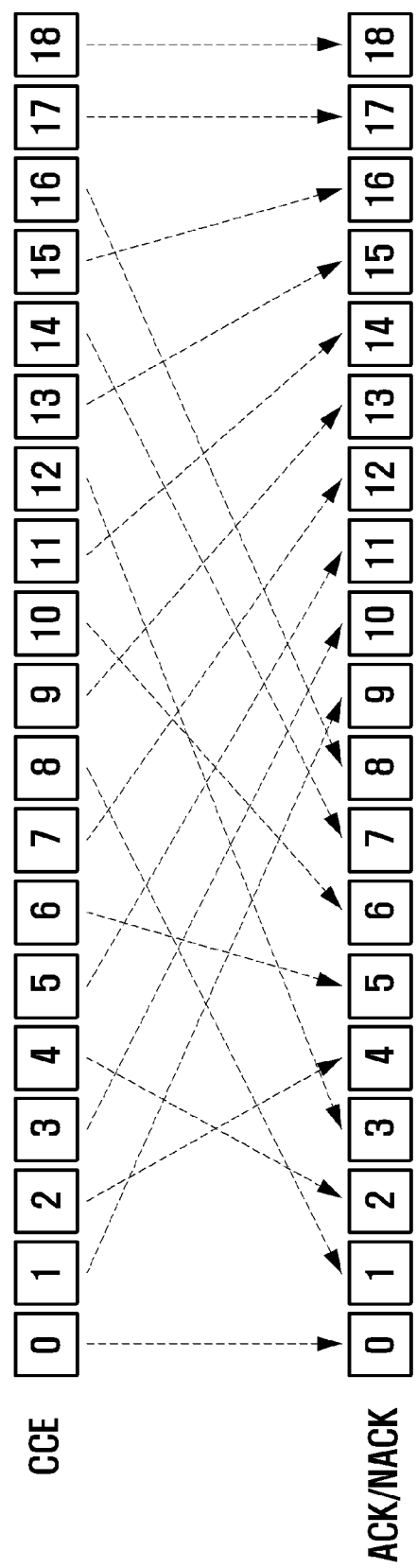
FIG. 11 shows a schematic diagram 1 for impliedly binding CCE in one sub-frame with ACK/NACK.

With reference to FIG. 11, suppose that a certain downlink sub-frame includes 19 CCEs with indexes of 0~18. Accordingly, if there are 19 ACK/NACK channels, they are indexed as 0~18. The method of present invention consist in that first, the CCEs with the minimum index in each PDCCH having 8 CCEs (indexed as 0 and 8) are bound to ACK/NACK channels indexed as 0 and 1; then, among remaining CCEs, the CCEs with the minimum index (indexed as 4 and 12) in the PDCCH having 4 CCEs are bound to ACK/NACK channels indexed as 2 and 3; next, among remaining CCEs, the CCEs with the minimum index in each PDCCH having 2 CCEs (indexed 2, 6, 10, 14 and 16) are bound to ACK/NACK channels indexed as 4~8; finally, remaining CCEs (indexed as 1, 3, 5, 7, 9, 11, 13, 15, 17 and 18) are bound to ACK/NACK channels indexed as 9~18.

Figure 12:
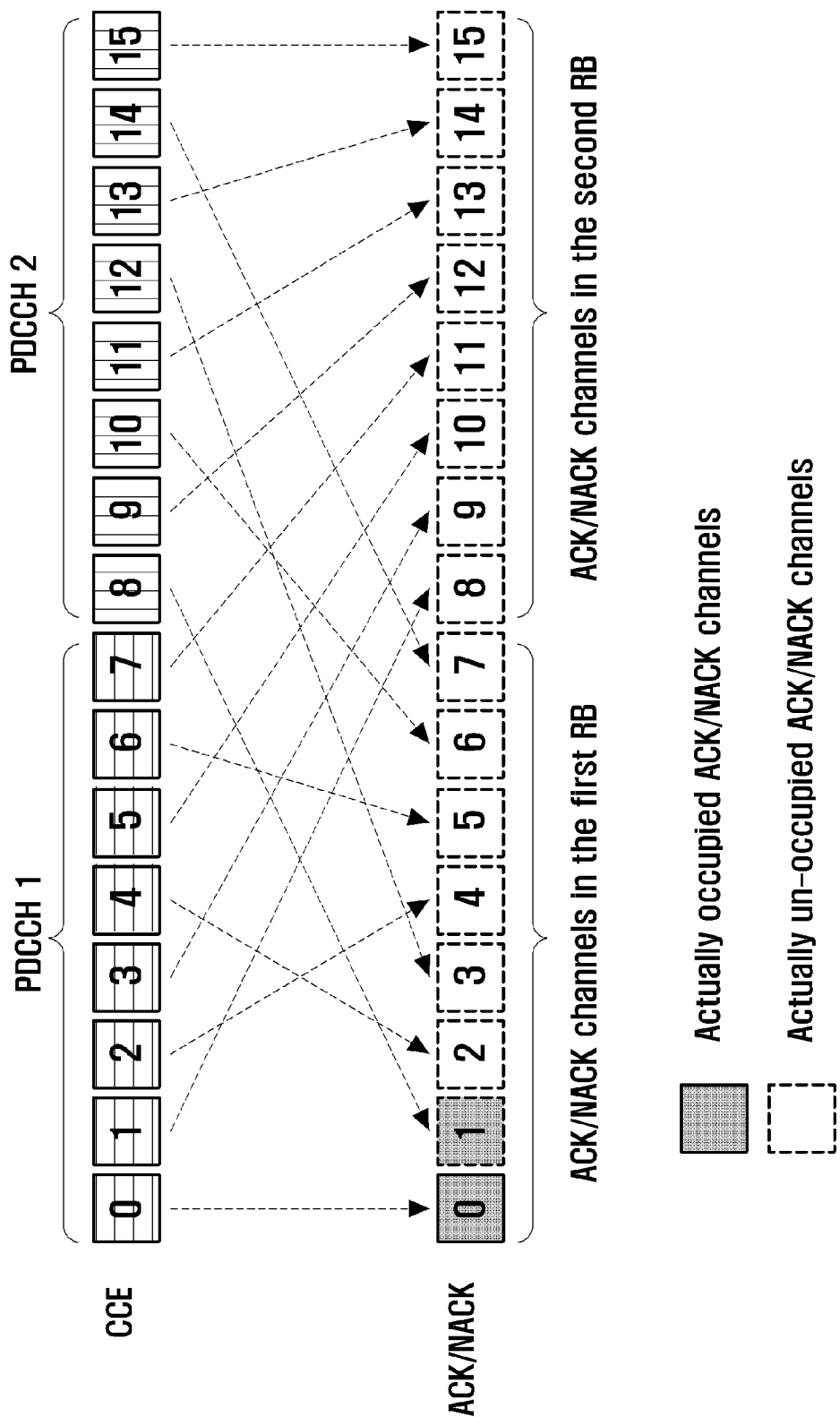
FIG. 12 shows a schematic diagram 2 for impliedly binding CCE in one sub-frame with ACK/NACK.

In FIG. 12, suppose that a certain downlink sub-frame includes 16 CCEs with indexes of 0~15; accordingly, if there are 16 ACK/NACK channels, they are indexed as 0~15. The method of present invention consist in that: first, the CCE with minimum index in each PDCCH having 8 CCEs (indexed as 0 and 8) are bound to ACK/NACK channels indexed as 0 and 1; then, among remaining CCEs, CCEs with the minimum index in each PDCCH having 4 CCEs (indexed as 4 and 12) are bound to ACK/NACK channels indexed as 2 and 3; next, among the remaining CCEs, CCEs with the minimum index in each PDCCH having 2 CCEs (indexed 2, 6, 10 and 14) are bound to ACK/NACK channels indexed as 4~7; finally, remaining CCEs (indexed as 1, 3, 5, 7, 9, 11, 13, and 15) are bound to ACK/NACK channels indexed as 8~15. As shown in FIG. 12, this downlink sub-frame includes two PDCCHs consisted of 8 CCEs respectively which are bound to ACK/NACK channels indexed as 0 and 1, i.e., both of ACK/NACK channels are distributed in the first RB while all ACK/NACK channels in the second RB are not occupied which means the second RB is idle so that node B can schedule it dynamically for uplink data transmission.

A Second Embodiment

The embodiment describes a method of present invention for impliedly binding CCE indexes in a plurality of sub-frames and ACK/NACK channel indexes in an uplink sub-frame. The LTE TDD system is taken as an example.

Figure 13:
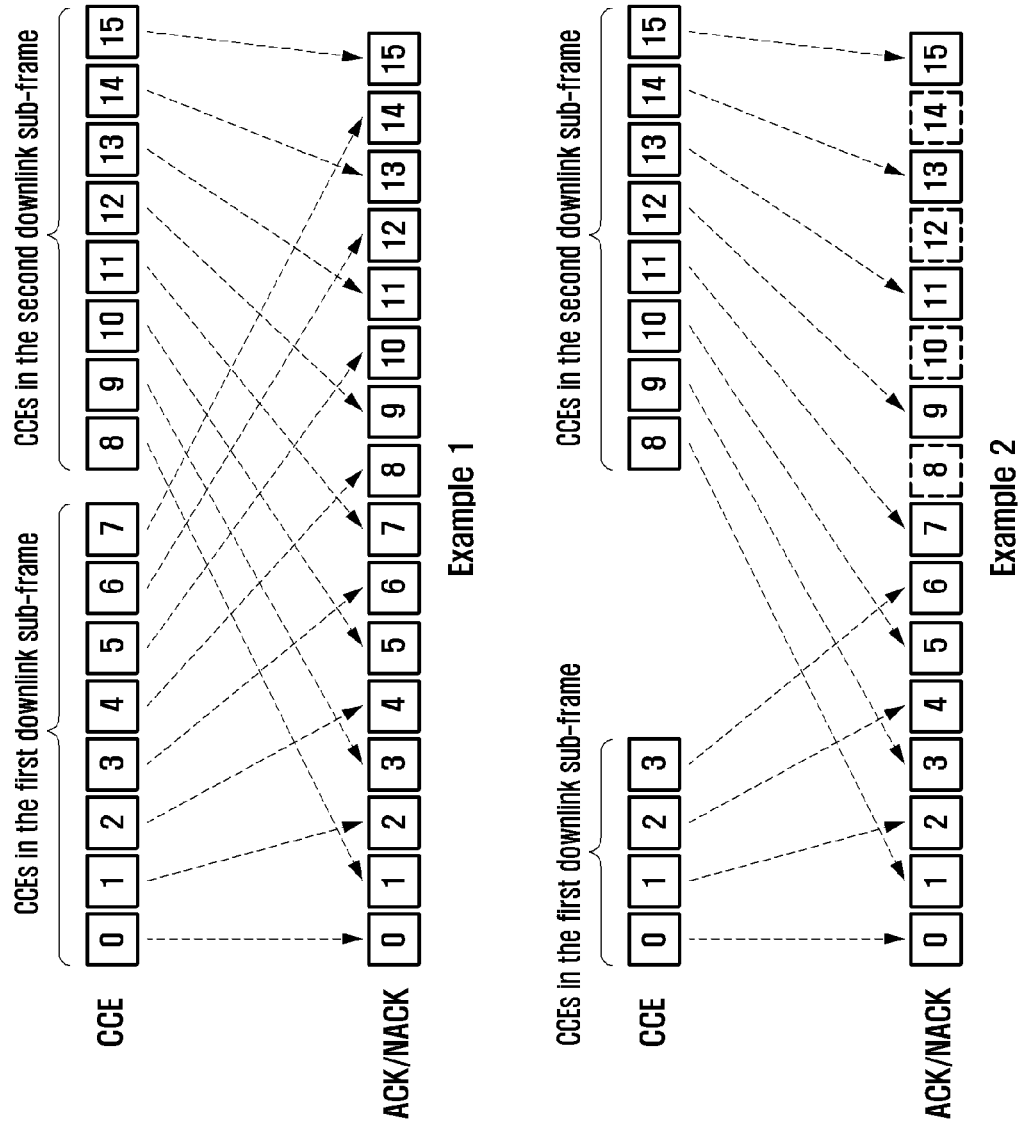
FIG. 13 shows schematic diagram 1 for impliedly binding CCE in two sub-frames with ACK/NACK.

In example 1 demonstrated in FIG. 13, suppose the number of CCEs in the first downlink sub-frame is 8, those in the second downlink sub-frame is 8. According to the methods of present invention, CCEs in the first downlink sub-frame are mapped to ACK/NACK channels indexed as even integers (0, 2, 4, 6, 8, 10, 12 and 14); those in the second downlink sub-frame are mapped to ACK/NACK channels indexed as odd integers (1, 3, 5, 7, 9, 11, 13 and 15). In example 2 demonstrated in FIG. 13, suppose that the number of CCEs in the first downlink sub-frame is 4, those in the second downlink sub-frame is 8. According to the methods of present invention, CCEs in a first downlink sub-frame are mapped to a first 4 ACK/NACK channels indexed as even integers (0, 2, 4 and 6); those in a second downlink sub-frame are mapped to ACK/NACK channels indexed as odd integers (1, 3, 5, 7, 9, 11, 13 and 15). With both example 1 and 2 described above, CCEs in the second downlink sub-frame are mapped to ACK/NACK channels regardless the number of CCEs in the first sub-frame, namely the PCFICH in the first sub-frame.

A Third Embodiment

The embodiment describes another method of present invention for impliedly binding CCE indexes in a plurality of sub-frames and ACK/NACK channel indexes in an uplink sub-frame. The LTE TDD system is taken as an example here. Suppose that CCEs in two downlink sub-frames have to be bound to ACK/NACK channels in the same uplink sub-frame, denote the total number of ACK/NACK channels in uplink sub-frame is $N_{AN}=16$. In this example, CCEs in the first downlink sub-frame are bound to ACK/NACK channels indexed from 0 in turns; those in the second downlink sub-frame are bound to ACK/NACK channels indexed from $$\frac{N_{AN}}{2} = 8$$

in turns.

Figure 14:
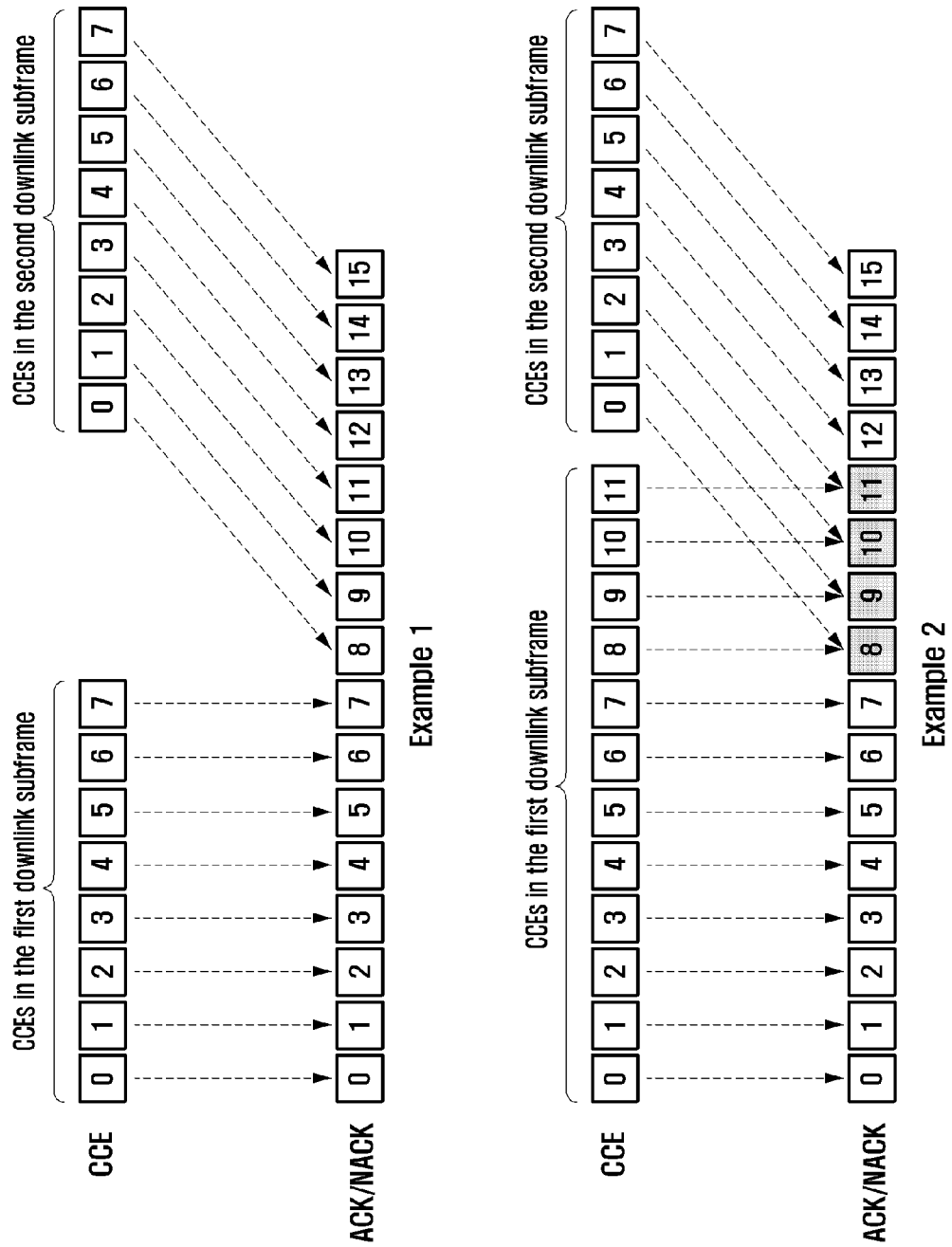
FIG. 14 shows a schematic diagram 2 for impliedly binding CCE in two sub-frames with ACK/NACK.

In example 1 demonstrated in FIG. 14, suppose that the number of CCEs in the first downlink sub-frame is 8, those in the second downlink sub-frame is also 8. According to the methods of present invention, CCEs in two downlink sub-frames are mapped to different ACK/NACK channels respectively. i.e., CCEs in the first downlink sub-frame are mapped to ACK/NACK channels indexed as 0~7; and those in the second downlink sub-frame are mapped to ACK/NACK channels indexed as 8~15.

In example 2 demonstrated in FIG. 14, suppose that the number of CCEs in the first downlink sub-frame is 12, those in the second downlink sub-frame is still 8. Based on the methods of present invention, CCEs in the first downlink sub-frame are mapped to ACK/NACK channels indexed as 0~11; and those in the second downlink sub-frame are still mapped to ACK/NACK channels indexed as 8~11. Obviously, CCEs in the first sub-frame indexed as 8~11 are mapped to the same ACK/NACK channels with CCEs in the second sub-frame indexed as 0~3. By now, Node B scheduler has to ensure no conflict exists in ACK/NACK channels that it schedules for downlink data transmission in two downlink sub-frames.

A Fourth Embodiment

This embodiment describes a method for mapping a plurality of CCEs to ACK/NACK channels when the number of CCEs in one downlink sub-frame is bigger than that of allocated ACK/NACK channels. Here, suppose that the number of CCEs in one downlink sub-frame is 28 and a total number of ACK/NACK channels allocated to one downlink sub-frame is $N_{AN}^{part}=16$. This example is available to both FDD and TDD. The formula $$i_{AN} = \mathrm{mod}\left(i_{CCE} + \delta + \mathrm{mod}(N_{AN}^{part} + 1, 2) \cdot \left\lfloor \frac{i_{CCE}}{N_{AN}^{part}} \right\rfloor, N_{AN}^{part}\right)$$

is taken as an example.

According to the formula $$i_{AN} = \mathrm{mod}\left(i_{CCE} + \delta + \mathrm{mod}(N_{AN}^{part} + 1, 2) \cdot \left\lfloor \frac{i_{CCE}}{N_{AN}^{part}} \right\rfloor, N_{AN}^{part}\right),$$

if δ=0, then $$i_{AN} = \mathrm{mod}\left(i_{CCE} + \mathrm{mod}(16 + 1, 2) \cdot \left\lfloor \frac{i_{CCE}}{16} \right\rfloor, 16\right) = \mathrm{mod}\left(i_{CCE} + \left\lfloor \frac{i_{CCE}}{16} \right\rfloor, 16\right).$$

Figure 15:
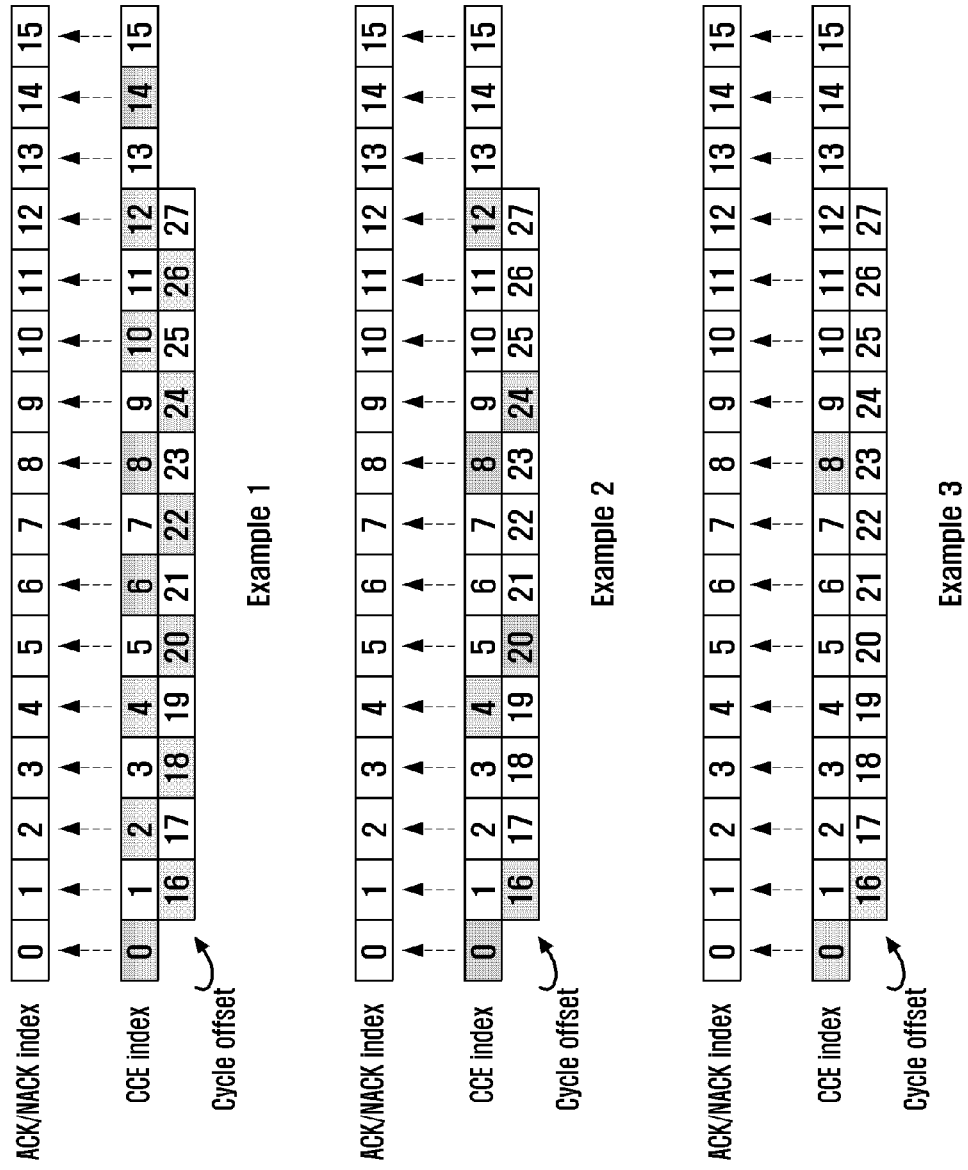
FIG. 15 shows a schematic diagram 3 for impliedly binding CCE in one sub-frame with ACK/NACK.

Based on this formula, when indexing the CCEs whose index is greater than or equal to $N_{AN}^{part}=16$, the circular offset is performed and the value for the offset is 1. FIG. 15 shows a schematic diagram of this method. With reference to FIG. 15, Example 1 shows a schematic diagram for indexing the PDCCH consisted of 2 CCEs to the ACK/NACKs and mapping 14 PDCCHs to different ACK/NACKs respectively. Example 2 shows a schematic diagram for indexing PDCCH consisted of 4 CCEs to ACK/NACKs and mapping 7 PDCCHs to different ACK/NACKs respectively.

Example 3 shows a schematic diagram for indexing PDCCH consisted of 8 CCEs to the ACK/NACKs and mapping 3 PDCCHs to different ACK/NACKs respectively.

This embodiment is also used to determine the mapping relation ship from the CCE to the ACK/NACK based on $$i_{AN} = \mathrm{mod}\left(i_{CCE} + \mathrm{mod}(N_{AN}^{part} + 1, 2) \cdot \left\lfloor \frac{i_{CCE}}{N_{AN}^{part}} \right\rfloor, N_{AN}^{part}\right) + \delta, \delta = 0.$$

A Fifth Embodiment

A so-called block interleaved mapping method may be used for mapping a plurality of CCEs to ACK/NACK channels. Next, such a block interleaved mapping method will be described firstly. A plurality of downlink sub-frames of ACK/NACK channels transmitted in one uplink sub-frame is defined as a binding window. Let the number of the downlink sub-frames within the binding window be D.

In this method it is defined only one set of boundary values $\{N_k, k=0, 1, 2, \ldots, k_{max}\}$ that partitions CCEs within the binding window. Here $N_0$ is fixed as 0, so that CCEs within each downlink sub-frames are divided into $k_{max}$ CCE blocks in the order of indexes of the CCEs. Here a block boundary is determined based on a maximum number of CCEs among different values for controlling the number of OFDM symbols of channels, it may also be determined with an equal division method. Let a size of each CCE block be C, then $N_k=k\cdot C$ is held, thereby simplifying formula design. However, the present invention is not limited.

Next, each sub-frame within the binding window is indexed. Herein, each sub-frame within the binding window may be indexed by time sequence. Alternatively, when the binding window contains a DwPTS, the DwPTS is constantly assigned with a maximum index D−1, while the other sub-frames are indexed as d=0, 1, 2, . . . D−2 by time sequence. When the binding window does not contain any DwPTS, each sub-frame is directly indexed as d=0, 1, 2, . . . D−1 by time sequence. However, the present invention has no limitation therein.

Next, CCE blocks of each downlink sub-frame is interleaved, and then indexes of ACK/NACK channels, to which the CCE blocks are to be mapped, are computed in turn. In particular, firstly, a $k=0^{th}$ CCE block in each sub-frame within the binding window is mapped to ACK/NACK channels successively by the sequence of the indexes of the sub-frames, i.e. CCEs within the $k=0^{th}$ CCE block of the $d=0^{th}$ sub-frame is mapped to ACK/NACK channels; then CCEs within the $k=0^{th}$ CCE block of the $d=1^{th}$ sub-frame is mapped to ACK/NACK channels; the rest may be deduced similarly, until CCEs within the $k=0^{th}$ CCE block of the $d=D-1^{th}$ sub-frame have been mapped to ACK/NACK channels. Then, the $k=1^{th}$ CCE block in each sub-frame within the binding window is mapped to ACK/NACK channels successively by the sequence of the indexes of the sub-frames, the rest may be deduced by analogy until the $k=k_{max}-1^{th}$ CCE block in each sub-frame within the binding window has been mapped to ACK/NACK channels.

Based on this interleaved mapping method from CCEs to ACK/NACK channels, for a CCE with an index $n_{CCE}$ of a downlink sub-frame within the binding window, a CCE block where the CCE locates is firstly determined, i.e. to find $N_k$ and $N_{k+1}$, wherein $N_k \leq n_{CCE} < N_{k+1}$, so that this CCE belongs to the $k^{th}$ CCE block. Let downlink sub-frames within the binding window are indexed as d=0, 1, 2, . . . D−1. In this way, for a CCE with an index $n_{CCE}$ of the $d^{th}$ downlink sub-frame, an index $n_{PUCCH}^{(1)}$ of an ACK/NACK channel, to which the CCE is mapped, may be computed by the following formula: $n_{PUCCH}^{(1)} = (D-1) \times N_k + d \times N_{k+1} + n_{CCE} + N_{PUCCH}^{(1)}$, here $n_{PUCCH}^{(1)}$ is a semi-statically configured parameter.

For the block interleaved method of mapping CCEs to ACK/NACK channels, the method for repeatedly mapping CCEs to ACK/NACK channels in Solution 3 of the present invention may be used to reduce overhead of the ACK/NACK channels. Let the binding window contains D downlink sub-frames, whose indexes are d=0, 1, 2, ... D−1 respectively. According to Solution 3 of the present invention, for a downlink sub-frame within the binding window, let the number of allocated ACK/NACK channels be $N_{AN}^{part}$, when a total number of CCEs within the sub-frame is bigger than $N_{AN}^{part}$, it is required to repeatedly map the CCEs to $N_{AN}^{part}$ ACK/NACK channels, which are allocated to the sub-frames. According to Solution 3 of the present invention, one circular offset η is added when it is required to repeatedly map CCEs to ACK/NACKs, so that all PDCCHs with 2-CCE (or 4-CCE, or 8-CCE) are mapped to different ACK/NACKs. Here, a circular offset $$\eta = \mod(N_{AN}^{part} + 1, 2) \cdot \left\lfloor \frac{n_{CCE}}{N_{AN}^{part}} \right\rfloor$$

may be set, wherein $n_{CCE}$ is an index for a CCE of the downlink sub-frame. That is to say, η is equal to 0 when $N_{AN}^{part}$ is an odd integer, and η is equal to $$\left\lfloor \frac{n_{CCE}}{N_{AN}^{part}} \right\rfloor$$

when $N_{AN}^{part}$ is an even integer. Here, mod(A,B) is a modular operation, which computes a reminder when A is divided by B.

In this way, with the method for repeatedly mapping CCEs to ACK/NACK channels in Solution 3 of the present invention, an index of an ACK/NACK channel, to which the CCEs are mapped, may be determined by the following steps. Let an index of a CCE of the $d^{th}$ downlink sub-frame within the binding window be $n_{CCE}$. Firstly, the index $$n'_{CCE} = \mod\left(n_{CCE} + \mod(N_{AN}^{part} + 1, 2) \cdot \left\lfloor \frac{n_{CCE}}{N_{AN}^{part}} \right\rfloor, N_{AN}^{part}\right),$$

$n_{CCE}$ is processed, so as to obtain which is used for ensuring that $N_{AN}^{part}$ is an even integer, and then CCEs are repeatedly mapped to the ACK/NACK channels to add a circular offset $$\left\lfloor \frac{n_{CCE}}{N_{AN}^{part}} \right\rfloor,$$

so that all PDCCHs with 2-CCE (or 4-CCE, or 8-CCE) are mapped to different ACK/NACKs as best as they can. Next, a CCE block where the CCE of an index $n'_{CCE}$ locates is determined, i.e. to find $N_k$ and $N_{k+1}$, wherein $N_k \leq n'_{CCE} < N_{k+1}$, so that this CCE belongs to the $k^{th}$ CCE block. Then, for a CCE with an index $n'_{CCE}$ of the $d^{th}$ downlink sub-frame, an index $n_{PUCCH}^{(1)}$ of an ACK/NACK channel, to which the CCE is mapped, may be computed by the following formula:

$$n_{PUCCH}^{(1)} = (D-1) \times N_k + d \times N_{k+1} + n'_{CCE} + N_{PUCCH}^{(1)},$$

wherein $n_{PUCCH}^{(1)}$ may be a semi-statically configured parameter. Here, D is the number of downlink sub-frames within the binding window, d is an index of a downlink sub-frame or a DwPTS, and $N_k$ and $N_{k+1}$ are boundary values of CCE values.

Here, the above three steps may be further reduced into two steps, in which a CCE block where the CCE of an index $n'_{CCE}$ locates is firstly determined, i.e. to find $N_k$ and $N_{k+1}$, wherein $$N_k < \mod\left(n_{CCE} + \mod(N_{AN}^{part} + 1, 2) \cdot \left\lfloor \frac{n_{CCE}}{N_{AN}^{part}} \right\rfloor, N_{AN}^{part}\right) < N_{k+1},$$

in this way, for a CCE with an index $n_{CCE}$ of the $d^{th}$ downlink sub-frame, an index $n_{PUCCH}^{(1)}$ of an ACK/NACK channel, to which the CCE is mapped, may be computed by the following formula:

$$n_{PUCCH}^{(1)} = (D-d-1) \times N_k + d \times N_{k+1} + \mod\left(n_{CCE} + \mod(N_{AN}^{part} + 1, 2) \cdot \left\lfloor \frac{n_{CCE}}{N_{AN}^{part}} \right\rfloor, N_{AN}^{part}\right) + N_{PUCCH}^{(1)}.$$

For the above method of reducing the overhead of ACK/NACK channels, when the number of ACK/NACK channels allocated to one downlink is more than a maximum number of CCEs within the downlink sub-frame, the above method of reducing the overhead of ACK/NACK channels is equivalent to that of mapping CCEs to ACK/NACK channels without considering the overhead of ACK/NACK channels.

It should be noted that, one expression of computing formulas has been given in the above, any variations to these formulas automatically belong to the scope of the present invention. In addition, if the division method is used to divide CCE blocks, the expression of the above formulas may be further simplified.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for transmitting an uplink response by a terminal, the method comprising:
    receiving, from a base station, downlink control information and downlink data corresponding to the downlink control information;
    identifying a resource index for an uplink response corresponding to the downlink data based on a first control channel element (CCE) used for transmission of the downlink control information;
    generating the uplink response using a cyclic shift, wherein the cyclic shift is identified based on the resource index; and
    transmitting, to the base station, the uplink response based on the resource index,
    wherein the resource index for the uplink response corresponding to the downlink data increases sequentially based on the first CCE used for transmission of the downlink control information, and wherein the first CCE is a lowest CCE index used for transmission of the downlink control information.

2. The method of claim 1, wherein the uplink response comprises an acknowledgement/negative acknowledgement (ACK/NACK) corresponding to the downlink data.

3. A method for receiving an uplink response by a base station, the method comprising:

transmitting, to a terminal, downlink control information and downlink data corresponding to the downlink control information; and receiving, from the terminal, an uplink response corresponding to the downlink data based on a resource index of the uplink response, the resource index being identified based on a first control channel element (CCE) used for transmission of the downlink control information, wherein the uplink response is generated using a cyclic shift, wherein the cyclic shift is identified based on the resource index, wherein the resource index for the uplink response corresponding to the downlink data increases sequentially based on the first CCE used for transmission of the downlink control information, and wherein the first CCE is a lowest CCE index used for transmission of the downlink control information.

4. The method of claim 3, wherein the uplink response comprises an acknowledgement/negative acknowledgement (ACK/NACK) corresponding to the downlink data.

5. A method for transmitting an uplink response by a terminal, the method comprising:

receiving, from a base station, at least one downlink control information and at least one downlink data corresponding to the at least one downlink control information on at least one downlink subframe;

identifying at least one resource candidate for an uplink response corresponding to the at least one downlink data based on a first control channel element (CCE) used for transmission of each of the at least one downlink control information and a number of the at least one downlink subframe associated with an uplink subframe transmitting the uplink response;

identifying acknowledgement/negative acknowledgement (ACK/NACK) information for the at least one downlink data, respectively;

identifying a resource among the at least one resource candidate based on the identified ACK/NACK information;

generating the uplink response using a cyclic shift, wherein the cyclic shift is identified based on an index of the identified resource; and transmitting, to the base station, the generated uplink response on the uplink subframe using the identified resource, wherein the first CCE is a lowest CCE index used for transmission of each of the at least one downlink control information.

6. The method of claim 5, wherein the uplink response comprises an ACK/NACK corresponding to the downlink data.

7. A method for receiving an uplink response by a base station, the method comprising:

transmitting, to a terminal, at least one downlink control information and at least one downlink data corresponding to the at least one downlink control information on at least one downlink subframe; and receiving, from the terminal, an uplink response corresponding to the at least one downlink data on an uplink subframe using a resource, wherein the resource is identified among at least one resource candidate for the uplink response based on identified acknowledgement/negative acknowledgement (ACK/NACK) information for the at least one downlink data, respectively, wherein the at least one resource candidate is identified based on a first control channel element (CCE) used for transmission of each of the at least one downlink control information and a number of the at least one downlink subframe associated with the uplink subframe, wherein the uplink response is generated using a cyclic shift, wherein the cyclic shift is identified based on an index of the identified resource, and wherein the first CCE is a lowest CCE index used for transmission of each of the at least one downlink control information.

8. The method of claim 7, wherein the uplink response comprises an ACK/NACK corresponding to the at least one downlink data.

9. A terminal for transmitting an uplink response, the terminal comprising:

a transceiver configured to transmit and receive a signal; and a controller configured to:

receive, from a base station, downlink control information and downlink data corresponding to the downlink control information, identify a resource index for an uplink response corresponding to the downlink data based on a first control channel element (CCE) used for transmission of the downlink control information, generate the uplink response using a cyclic shift, wherein the cyclic shift is identified based on the resource index, and transmit, to the base station, the uplink response based on the resource index, wherein the resource index for the uplink response corresponding to the downlink data increases sequentially based on the first CCE used for transmission of the downlink control information, and wherein the first CCE is a lowest CCE index for transmission of the downlink control information.

10. The terminal of claim 9, wherein the uplink response comprises an acknowledgement/negative acknowledgement (ACK/NACK) corresponding to the downlink data.

11. A base station for receiving an uplink response, the base station comprising:

a transceiver configured to transmit and receive a signal; and a controller configured to control the transceiver to:

transmit, to a terminal, downlink control information and downlink data corresponding to the downlink control information to a terminal, and receive, from the terminal, an uplink response corresponding to the downlink data based on a resource index of the uplink response, the resource index being identified based on a first control channel element (CCE) used for transmission of the downlink control information, wherein the uplink response is generated using a cyclic shift, wherein the cyclic shift is identified based on the resource index, wherein the resource index for the uplink response corresponding to the downlink data increases sequentially based on the first CCE used for transmission of the downlink control information, and wherein the first CCE is a lowest CCE index used for transmission of the downlink control information.

12. The base station of claim 11, wherein the uplink response comprises an acknowledgement/negative acknowledgement (ACK/NACK) corresponding to the downlink data.

13. A terminal for transmitting an uplink response, the terminal comprising:

a transceiver configured to transmit and receive a signal; and a controller configured to:

receive, from a base station, at least one downlink control information and at least one downlink data corresponding to the at least one downlink control information on at least one downlink subframe, identify at least one resource candidate for an uplink response corresponding to the at least one downlink data based on a first control channel element (CCE) used for transmission of each of the at least one downlink control information and a number of the at least one downlink subframe associated with an uplink subframe transmitting the uplink response, identify acknowledgement/negative acknowledgement (ACK/NACK) information for the at least one downlink data channel, respectively, identify a resource among the at least one resource candidate based on the identified ACK/NACK information, generate the uplink response using a cyclic shift, wherein the cyclic shift is identified based on an index of the identified resource; and transmit, to the base station, the generated uplink response on the uplink subframe using the identified resource, wherein the first CCE is a lowest CCE index used for transmission of each of the at least one downlink control information.

14. The terminal of claim 13, wherein the uplink response comprises an ACK/NACK corresponding to the at least one downlink data.

15. A base station for receiving an uplink response, the base station comprising:

a transceiver configured to transmit and receive a signal; and a controller configured to control the transceiver to:

transmit, to a terminal, at least one downlink control information and at least one downlink data corresponding to the at least one downlink control information on at least one downlink subframe, receive, from the terminal, an uplink response corresponding to the at least one downlink data on an uplink subframe using a resource, wherein the resource is identified among at least one resource candidate for the uplink response based on identified acknowledgement/negative acknowledgement (ACK/NACK) information for the at least one downlink data, respectively, wherein the at least one resource candidate is identified based on a first control channel element (CCE) used for transmission of each of the at least one downlink control information and a number of the at least one downlink subframe associated with the uplink subframe, wherein the uplink response is generated using a cyclic shift, wherein the cyclic shift is identified based on an index of the identified resource, and wherein the first CCE is a lowest CCE index used for transmission of each of the at least one downlink control information.

16. The base station of claim 15, wherein the uplink response comprises an ACK/NACK corresponding to the at least one downlink data.

* * * * *